US010514483B2

(12) United States Patent
Heshmat Dehkordi et al.

(10) Patent No.: US 10,514,483 B2
(45) Date of Patent: Dec. 24, 2019

(54) TIME-OF-FLIGHT CAMERA FOR IMAGING THROUGH OPTICAL CAVITY

(71) Applicant: Massachusetts Institute of Technology, Cambridge, MA (US)

(72) Inventors: Barmak Heshmat Dehkordi, Cambridge, MA (US); Matthew Tancik, Cambridge, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 37 days.

(21) Appl. No.: 15/682,145

(22) Filed: Aug. 21, 2017

(65) Prior Publication Data

US 2018/0106936 A1  Apr. 19, 2018

Related U.S. Application Data

(60) Provisional application No. 62/407,927, filed on Oct. 13, 2016.

(51) Int. Cl.
*H04N 5/225* (2006.01)
*G02B 5/28* (2006.01)
(Continued)

(52) U.S. Cl.
CPC ............ *G02B 5/288* (2013.01); *G02B 27/286* (2013.01); *H04N 5/2254* (2013.01); *H04N 5/265* (2013.01);
(Continued)

(58) Field of Classification Search
CPC ........ G01S 7/4811; G01S 7/483; G01S 17/42; G01S 17/88; G01S 17/89;
(Continued)

(56) References Cited

U.S. PATENT DOCUMENTS 7,460,247 B1   12/2008  Ackerman
9,442,186 B2*  9/2016   Payne ................... G01S 7/493
(Continued)

OTHER PUBLICATIONS

Brent, L., et al., Evaluation of the use of a commercially available cavity ringdown absorption spectrometer for measuring NO2 in flight, and observations over the Mid-Atlantic States, during DISCOVER-AQ; published in Journal of Atmospheric Chemistry, Sep. 2015, vol. 72, Issue 3-4, pp. 503-521.
(Continued)

*Primary Examiner* — Ngoc Yen T Vu
(74) *Attorney, Agent, or Firm* — Stephen R. Otis

(57) ABSTRACT

In illustrative implementations, an imaging system may comprise a lens, an optical cavity and a time-of-flight camera. The imaging system may capture an image of a scene. The image may be formed by light that is from the scene and that passes through the optical cavity and the lens. In some cases, the lens is in front of the optical cavity, enabling the Euclidean distance between the lens and the camera sensor to be less than the nominal focal length of the lens. In some cases, the lens is inside the optical cavity, enabling the camera to acquire ultrafast multi-zoom images without moving or changing the shape of any optical element. In some cases, the lens is behind the optical cavity, enabling the system to perform ultrafast multi-spectral imaging. In other cases, an optical cavity between the scene and time-of-camera enables ultrafast ellipsometry measurements or ultrafast spatial frequency filtering.

3 Claims, 15 Drawing Sheets

(51) Int. Cl.
  *G02B 27/28* (2006.01)
  *H04N 5/265* (2006.01)
  *H04N 5/262* (2006.01)
  *G01S 17/88* (2006.01)
  *G06T 7/521* (2017.01)
  *G02B 27/30* (2006.01)
  *G01S 7/48* (2006.01)

(52) U.S. Cl.
  CPC .......... *H04N 5/2621* (2013.01); *G01S 7/4804* (2013.01); *G02B 27/30* (2013.01); *G06T 7/521* (2017.01)

(58) Field of Classification Search
  CPC ..... H04N 5/2252–2254; H04N 13/271; H04N 5/2621; G06T 7/521
  See application file for complete search history.

(56) References Cited

U.S. PATENT DOCUMENTS

| | | |
|---|---|---|
| 2010/0282967 A1 | 11/2010 | Ouyang |
| 2013/0032722 A1 | 2/2013 | Szupryczynski et al. |
| 2016/0225922 A1 | 8/2016 | Akkaya et al. |
| 2016/0259059 A1* | 9/2016 | Mohseni ................. G01S 17/89 |
| 2018/0011195 A1* | 1/2018 | Perry .................... G01S 17/325 |
| 2018/0146186 A1* | 5/2018 | Akkaya .................... G01S 1/00 |

OTHER PUBLICATIONS

Huang, E., et al., Ultrafast Imaging using Spectral Resonance Modulation; published in Scientific Reports 6, Article No. 25240 (Apr. 28, 2016).

Li, G., et al., Near field imaging with resonant cavity lens; published in Optics Express, vol. 18, No. 3; pp. 2325-2331 (Feb. 1, 2010).

Zhao, Z. et al., Going far beyond the near-field diffraction limit via plasmonic cavity lens with high spatial frequency spectrum off-axis illumination; published in Scientific Reports 5, Article No. 15320 (Oct. 2015).

* cited by examiner

TIME-OF-FLIGHT CAMERA FOR IMAGING THROUGH OPTICAL CAVITY

RELATED APPLICATIONS

This application claims the benefit of U.S. Provisional Application No. 62/407,927, filed Oct. 13, 2016 (the "Provisional Application"), the entire disclosure of which is herein incorporated by reference.

FIELD OF TECHNOLOGY

The present invention relates generally to time-of-flight imaging.

SUMMARY

In illustrative implementation of this invention, an imaging system may comprise a lens, an optical cavity and a time-of-flight ("ToF") or ultrafast sensor. The imaging system may capture an image of a scene. The image may be formed by light that is from the scene and that passes through the optical cavity and the lens. In some cases, the lens is in front of the optical cavity, enabling the Euclidean distance between the lens and the camera sensor to be less than the nominal focal length of the lens. In some cases, the lens is inside the optical cavity, enabling the camera to acquire ultrafast multi-zoom images without moving or changing the shape of any optical element. In some cases, the lens is behind the optical cavity, enabling the system to perform ultrafast multi-spectral imaging. In other cases, an optical cavity between the scene and time-of-flight camera enables ultrafast ellipsometry measurements or ultrafast spatial frequency filtering.

In some implementations, an optical cavity ("OC") is located in an optical path between (i) a scene and (ii) a ToF or ultrafast camera that is capturing an image of the scene. One or more walls of the cavity may comprise semi-transparent mirrors. Light from the scene may enter the optical cavity by passing through a semi-transparent mirror ("STM") of the cavity, and may then reflect repeatedly inside the cavity. When light inside the cavity strikes an STM wall of the cavity, a portion of the light may be reflected back into the cavity and a portion of the light may be transmitted through the STM (and thereby escape the cavity). Thus, during reflections that occur at the end of the first pass of light in the cavity and at the end of each roundtrip of light in the cavity, respectively, a portion of the light may be transmitted through a STM and thereby escape the cavity. This escaped light may then travel to the ToF camera.

In some use scenarios: (a) a pulse of light from the scene enters the cavity; and (b) the light that escapes the cavity (after the first pass and after each roundtrip inside the cavity) and travels to the ToF camera comprises a temporal sequence of light pulses ("exit pulses"), such that an exit pulse occurs at the end of the first pass and at the end of each roundtrip, respectively.

In illustrative implementations of this invention, the temporal resolution of the ToF camera is faster than the temporal duration of a roundtrip of light inside the cavity. For example, in some implementations: (a) a pulse of light from the scene enters the optical cavity; (b) exit pulses of light exit the cavity; and (c) the ToF camera has sufficient temporal resolution to distinguish each exit pulse.

If conventional imaging techniques were employed (e.g., a conventional slow camera), then placing an optical cavity in the optical path between the scene and the camera would be a disaster for imaging, because the cavity would tend to greatly degrade the light signal from the scene by suppressing non-resonant frequencies.

However, in illustrative implementations of this invention, this problem is solved. In illustrative implementations, the ToF camera acquires data about light exiting the optical cavity during an extremely short period of time before the effects of optical resonance in the cavity become pronounced. This short period may begin at a time when light from the scene enters the cavity and may end when a relatively small number of roundtrips of that light in the cavity have occurred (e.g., 100 or less roundtrips). Or this short period may begin at a time when light from the scene enters the cavity and may end when the integral power of the dominant mode of that light in the optical cavity is equal to half-maximum of the integral power of the evolving wavefront of that light inside the optical cavity. In illustrative implementations, during this short period of time, the effects of optical resonance do not significantly degrade the light signal from the scene. Thus, in illustrative implementations, the light signal from the scene that the ToF camera captures is not significantly degraded by optical resonance, even through the light from the scene passes through an optical cavity.

Passing light from the scene through an optical cavity, before it reaches the ToF camera—and before the effects of resonance in the cavity become significant—has many practical applications for ultrafast imaging. These practical applications may include: (a) achieving a smaller form factor; (b) ultrafast multi-zoom imaging; (c) ultrafast multi-spectral imaging; (d) ultrafast ellipsometric imaging, and (e) ultrafast spatial frequency filtering.

In some cases, the optical cavity enables a much smaller form factor for a ToF imaging system, by folding the optical path between a lens and a ToF camera sensor. For example, in some cases: (a) an optical cavity is located between a lens and the ToF camera sensor; and (b) the cavity folds the optical path between the lens and the camera, thereby reducing the Euclidean physical distance between the lens and the rear focal plane of the lens. This folding of the optical path (by reflections inside the cavity) enables the Euclidean physical distance between a lens and a ToF camera sensor to be greatly reduced (e.g., to an order of magnitude less than the nominal focal length of the lens). Thus, the optical cavity may facilitate a much more compact form factor for a ToF imaging system (or may facilitate the use of longer focal length lenses).

In some implementations of this invention, the optical cavity enables ultrafast, multi-zoom imaging. For example, in some cases: (a) an optical cavity is located in front of a ToF camera; (b) a lens is located inside the optical cavity; (c) light passes through the lens (which is inside the cavity) repeatedly, such as during the first pass of light inside the cavity and during each roundtrip of light inside the cavity, respectively; (d) as the light reflecting inside the cavity passes through the lens repeatedly, the light is further diffracted during each pass of light through the lens; and (e) each pass of light through the lens causes an optical system (comprising the lens and optical cavity) to be focused at a different depth of the scene, because each pass of light through the lens changes the convergence or divergence of the wavefront. Thus, in some cases, a lens inside the optical cavity enables the ToF camera to function as multi-zoom ultrafast camera; one that is configured to focus on two or more focal planes at different depths (e.g., depths that differ by an order of magnitude or more) with different magnification factors. The multi-zoom image may be captured during a single ultrafast acquisition frame using a single set of optical elements, without physically altering the focal length of the lens and without physically moving any optical element.

In some implementations, a set of optical cavities (each of which has a different cavity size) time-encodes different spectrums from different spectral filters. In some cases, these time-encoded spectrums from the different spectral filters enable a ToF camera to perform single-acquisition multi-spectral imaging at ultrafast rates. For example, in some cases, these time-encoded spectrums enable the ToF to perform multi-spectral imaging at the nominal temporal resolution of the ToF camera, with no loss of spatial resolution and with no loss of temporal resolution.

For example, in some implementations for multi-spectral imaging, the entrance optics of a ToF imaging system include a uniaxial configuration of filters. For example, the entrance optics may include an ND filter that transmits a broad band of frequencies and also include multiple notch filters. The ND filter and notch filters may be arranged in a uniaxial configuration, such that the ND filter is in front of a "stack" of notch filters, which are in front of a lens, which is in front of a ToF camera. Each notch filter may transmit substantially all light in the broad band, except that each notch filter may reduce transmission of light in a particular notch (subband) of frequencies. For example, each notch filter may reflect a majority of light in its respective notch and may transmit a minority of light in its respective notch. The notch (subband) of frequencies may be different for each of the notch filters. The number of optical cavities in the imaging system may be equal to the number of notch filters. Each of the optical cavities, respectively, may be formed by the broadband ND filter and one of the notch filters. Because each notch filter may have a different notch of frequencies, the spectral composition of light that reflects in a complete roundtrip in each cavity, respectively, may be different. Furthermore, the size of the optical cavities may differ, because the distance between the broadband filter and the cavity's notch filter may differ from cavity to cavity. Thus, the duration of a roundtrip of light in the different cavities may differ. This, in turn, may cause light to exit the different cavities at different times and arrive at a ToF camera at different times, thereby time-encoding spectral information (because light exiting the different optical cavities may have a different spectral composition, due to the different notches).

Alternatively, in some multi-spectral implementations of this invention, two or more spectral filters are positioned side-by-side (instead of being located in a uniaxial arrangement). For example, in some implementations: (a) two spectral filters are located side-by-side; (b) there are two optical cavities, one cavity behind each of the spectral filters, respectively; (c) each optical cavity is formed by two ND filters; (d) the two optical cavities are in front of a lens, which is in front of a ToF camera; (e) a different spectral composition of light exits the first cavity than the second cavity; because different spectral filters are in front of the two optical cavities; (f) the size of the optical cavities differ, because the distance between the two ND filters in the first cavity is different than in the second cavity; and (e) the different size of the optical cavities causes the duration of a roundtrip of light in the cavities to be different. Thus, in the example described in the previous sentence, the optical cavities: (a) may delay the first and second spectrums by different amounts of time due to the different roundtrip distances in the cavities; and (b) may thereby time-encode spectral information.

Alternatively, each of the spectral filters may be located inside an optical cavity: e.g., a first spectral filter may be positioned inside the first optical cavity and a second spectral filter may be positioned inside the second optical cavity. Placing a spectral filter inside an optical cavity—such that light reflecting repeatedly inside the cavity passes through spectral filter repeatedly—may tend to sharpen the spectral window of the filter in an exponential manner, because the light signal passing through the filter may be multiplied by the filter each time that light passes through the filter.

In many embodiments, each of these three applications (smaller form factor, multi-zoom and multi-spectral), may be implemented with compact coaxial optics that fit into the form factor of a practical conventional camera lens.

In some implementations of this invention, the optical cavity enables ultrafast ellipsometry measurements. For example, in some cases: (a) a ring optical cavity is located in an optical path between a scene and a ToF camera; and (b) a half-wave plate is located inside the ring cavity. The half-wave plate rotates the polarization of light, each time that light passes through the half-wave plate (e.g., during each roundtrip of light inside the optical cavity). After each roundtrip of light in the ring cavity, a portion of light exits the cavity by passing through a semi-transparent mirror (STM), then passes through a linear polarizer (which is in a fixed position), and then travels to a ToF camera. Because the polarization of light is rotated by a small angle in each roundtrip, the polarization of light exiting the STM (and striking the linear polarizer) is different for different roundtrips. Thus, after each roundtrip in the cavity, the fixed linear polarizer filters a different portion of the polarization spectrum of the initial light that entered the cavity. In some implementations, this configuration (half-wave plate inside ring cavity) enables the ToF camera to take ellipsometry measurements.

In some implementations of this invention, the optical cavity enables ultrafast filtering of spatial frequencies of a light signal. For example, in some cases: (a) a collimating lens outputs collimated light that, while collimated, passes through a Fourier plane and then, while still collimated, is incident on the optical cavity; (b) a mask is located inside the cavity; and (c) the mask filters different spatial frequencies of light, each time that light passes through the mask (e.g., during roundtrips of light inside the optical cavity). Without being limited by theory, this may be because: (a) each point in a Fourier plane may correspond to a different spatial frequency; and (b) light may strike different points in the mask in different roundtrips inside the cavity (due to the fact that the optical cavity is unstable), and thus different spatial frequencies may be filtered in each roundtrip of light in the cavity. A portion of the light inside the optical cavity escapes the cavity at the end of the first pass in the cavity and at the end of each roundtrip in the cavity, respectively, and then travels through an imaging lens and reaches a ToF camera. This configuration (mask inside unstable optical cavity, which in turn is in a Fourier volume created by a collimating lens) may enable the ToF camera to perform ultrafast filtering of spatial frequencies of a light signal.

In each of the five applications discussed above (smaller form factor, multi-zoom, multi-spectral, ellipsometric and spatial frequency filtering): (a) the temporal resolution may still be the nominal temporal resolution of the ultrafast ToF camera; and (b) therefore ultrafast phenomena may be imaged with no loss of spatial or temporal resolution.

The Summary and Abstract sections and the title of this document: (a) do not limit this invention; (b) are intended only to give a general introduction to some illustrative implementations of this invention; (c) do not describe all of the details of this invention; and (d) merely describe non-limiting examples of this invention. This invention may be implemented in many other ways. Likewise, the description of this invention in the Field of Technology section is not limiting; instead it identifies, in a general, non-exclusive manner, a field of technology to which some implementations of this invention generally relate.

BRIEF DESCRIPTION OF THE DRAWINGS

FIG. 1A shows illumination hardware and a mask.
FIG. 1B shows mirrors that steer light.
FIG. 1C shows entrance optics in front of a ToF camera.

The above Figures show some illustrative implementations of this invention, or provide information that relates to those implementations. The examples shown in the above Figures do not limit this invention. This invention may be implemented in many other ways.

DETAILED DESCRIPTION

Figures 1A, 1B, 1C:
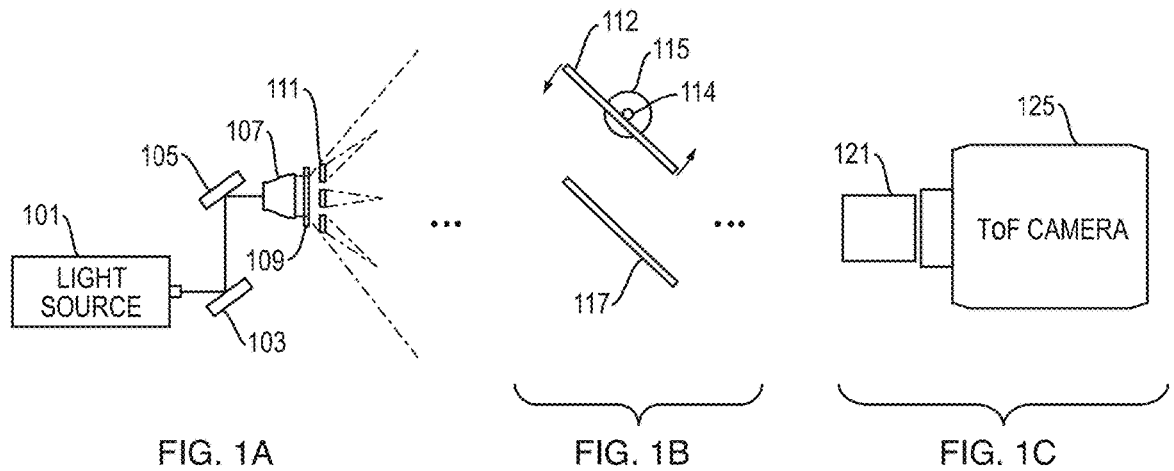
FIGS. 1A, 1B and 1C together show an example of hardware of a ToF imaging system.

FIGS. 1A, 1B and 1C together show an example of hardware of a ToF imaging system, in an illustrative implementation of this invention.

FIG. 1A shows illumination hardware and a mask, in an illustrative implementation of this invention. In the example shown in FIG. 1A, the illumination hardware includes a light source 101, mirrors 103, 105, a beam expander 107, and a diffuser 109. In FIG. 1A, the light source 101 emits light that is steered by mirror 103, then steered by mirror 105, then spread out by beam expander 107, and then diffused by diffuser 109 to create a diffuse backlight.

In many implementations of this invention, the light source 101 comprises a pulsed laser. For example, in some implementations, the light source comprises a Mira® 900 mode-locked Ti-Sapphire laser that has a short pulse width or a SuperK® supercontinuum laser that produces multi spectral light.

However, this invention is not limited to lasers and is not limited to any particular kind of light. The light source 101 may comprise any artificial active light source, including a laser or LED (light emitting diode). The light source may emit any kind of light, including pulsed light, light that is not pulsed, coherent light, collimated light, uncollimated light, narrow spectrum light, wide spectrum light, visible light, infrared light, or ultraviolet light.

In FIGS. 1A, 1B and 1C: (a) a mask 111 functions as a transmissive scene; and (b) a ToF camera 125 captures one or more images of this transmissive scene. For example, in some implementations, the scene that is imaged comprises a mask that is placed behind the diffuser and that comprises an opaque polyvinyl sheet with a cutout, or comprises a multi-colored polyvinyl sheet.

However, this invention is not limited to any particular type of scene, which is imaged by the ToF camera. For example, the scene may be transmissive (such that, light is transmitted through the scene before reaching the ToF camera) or reflective (such that light reflects from the scene before reaching the ToF camera), or may be both transmissive and reflective. The ToF camera may capture images of a scene, where the light from the scene includes light that reflects from the scene and light that is transmitted through the scene.

FIG. 1B shows mirrors that steer light, in an illustrative implementation of this invention. In the example shown in FIGS. 1A, 1B and 1C, mirror 112 and mirror 117 steer light from a scene, such that light from the scene travels to a ToF camera 125. Mirror 112 is rotatable: an actuator 115 may actuate rotation of a rod 114 that is attached to mirror 112, thereby rotating mirror 112. Mirror 112 may be rotated in order to scan different portions of the scene being imaged. For example, in some implementations of this invention: (a) the ToF camera comprises a streak camera that captures x-t images, where each x-t image measures spatial information in only the horizontal x dimension; (b) mirrors 112 and 117 comprise a periscope mirror set; (c) mirror 112 is rotated to different angular positions, such that the ToF camera captures an x-t image at different y positions of the scene; and (d) data from the x-t images for all of they positions, respectively, are combined to create an x-y-t data cube. Thus, the x-y-t data cube may comprise data regarding light that is incident on a 2D surface (with x-y dimensions) at different times during a temporal period.

However, in some cases, the scanning periscope mirrors are omitted. For example, in some cases, the ToF camera 125 measures spatial information in both the x and y dimensions at the same time; and thus, there is no need for a scanning mirror to scan different regions (e.g., different y positions) in the scene. For example, one may avoid they scan by using a 2D single-photo-avalanche diode array (SPAD) camera or 2D ToF sensor or by using a lenslet array to achieve 2D image acquisition.

FIG. 1C shows entrance optics in front of a ToF camera, in an illustrative implementation of this invention. In the example shown in FIGS. 1A, 1B and 1C, light from the scene is steered by mirrors 112, 117, then passes through entrance optics 121, and then is measured by a ToF camera 125.

In illustrative implementations, the entrance optics 121 comprises one or more optical cavities, one or more lenses, and optionally one or more other optical elements (such as a waveplate, mask, spatial light attenuator, or other reflective, transmissive or attenuating optical element).

The one or more lenses in the entrance optics 121 may comprise a single lens, compound lens or a lens system. Any type of lens may be employed in the entrance optics 121. For example, in some cases, the entrance optics 121 includes one or more achromatic doublet lenses.

The one or more optical cavities in the entrance optics 121 may be of any type. For example, an optical cavity ("OC") in the entrance optics 121 may comprise a Fabry-Perot ("FP") optical cavity (such as a FP solid optical etalon, or a FP air-spaced optical etalon), any other type of linear OC, a ring OC, or a bowtie OC. One or more reflective surfaces of the optical cavity may comprise a semi-transparent mirror ("STM"). In some implementations: (a) each optical cavity in the entrance optics 121 is a FP cavity; (b) each FP cavity comprises two reflective, neutral density filters ("ND filters"); (c) each of the ND filters is a semi-transparent mirror that, when struck by incident light, reflects a portion of incident light and transmits (through the ND filter) a portion of the incident light; and (d) in each FP cavity, the two ND filters are approximately parallel to each other, such that light inside the cavity reflects repeatedly inside the cavity, back and forth between the two ND filters.

The one or more optical cavities in the entrance optics 121 may be stable or unstable. To say that an optical cavity is "unstable" means that light reflecting inside the cavity tends to move further and further away from an axis of the cavity in each successive reflection, until the light escapes the cavity.

In a prototype of this invention: (a) light from the scene passes through entrance optics and then enters a streak camera; (b) the entrance optics comprise a lens and two neutral density reflective filters; (c) the streak camera is a Hamamatsu® Orca® R2 C10600 streak camera with a sweep unit; (d) the streak camera captures x-t images with a spatial x resolution of 672 pixels and a temporal resolution of 512 time bins (2 ps each); (e) they dimension is recorded by sweeping a periscope mirror set; and (f) data from the x-t images at different y positions is combined to create an x-y-t data cube that may be visualized. The prototype described in this paragraph is a non-limiting example of this invention; this invention may be implemented in many other ways.

In many implementations of this invention, the optical cavity (OC) includes at least one semi-transparent mirror ("STM"). In some use scenarios of this invention, light from the scene may enter the OC, and then reflect repeatedly inside the OC. During (or at the end of) each round-trip of light inside the OC), the light may strike a given STM. (For example, the given STM may comprise STM 135 in FIGS. 2A, 2B, 2C, 3, or ND filter 435 in FIG. 4, or ND filter 535 in FIGS. 5A, 5B, 5C, or STM 735 in FIG. 7, or STM 835 in FIG. 9, or STM 1033 in FIG. 10, or STM 1235 in FIG. 11). This given STM may be partially transmissive and partially reflective, such that when light inside the OC is incident on the given STM, a portion of the incident light reflects back into the OC and another portion of the light passes through the given STM and then travels to a ToF camera. In some implementations: (a) a pulse of light from the scene enters the OC and reflects repeatedly inside the OC, and (b) a temporal sequence of light pulses (which are less intense than the light pulse that entered the OC from the scene) exit the OC by passing through the given STM. These light pulses that exit the OC and travel to the ToF camera are sometimes called "exit pulses" herein.

In illustrative implementations: (a) the temporal resolution of the ToF camera is shorter than the duration of a round trip of light in the OC; and (b) the ToF camera distinguishes between light that exits the OC at the end of different round trips in the OC. For example, in some cases: (a) a pulse of light from the scene may enter the optical cavity; and (b) the temporal resolution of the ToF camera may be sufficiently fast that the ToF camera detects each individual exit pulse of light that exits from the OC.

The more times that light reflects back and forth inside the OC, the greater are the effects of optical resonance in the OC. When the number of roundtrips of light in the OC becomes sufficiently large, the optical resonance tends to destroy information contained in non-resonant frequencies, thereby degrading the light signal from the scene so much that it becomes useless for imaging.

In illustrative implementations of this invention, this problem (of resonance degrading the light signal) is avoided or mitigated, by utilizing data regarding only "early light". The early light may consist of light from the scene that exits an optical cavity before completing more than 100 roundtrips inside the cavity. For example, in some cases the ToF camera may create a digital image, using only data that represents measurements of early light taken by the ToF camera, where the early light consists of only light from the scene which entered an optical cavity and then exited the cavity: (a) after no more than three roundtrips in the cavity; or (b) after no more than six roundtrips in the cavity; or (c) after no more than twelve roundtrips in the cavity, or (d) after no more than 100 roundtrips in the cavity.

Alternatively, in some implementations, the early light consists of light from the scene that exits the optical cavity before the integral power of the dominant mode of that light in the optical cavity is equal to half-maximum of the integral power of the evolving wavefront of that light inside the optical cavity For example, the ToF camera may capture images formed only by early light. Or, data from measurements of only early light may be used to generate a digital image of the scene, regardless of whether the ToF camera captures data regarding other light.

For example, in some implementations: (a) a pulse of light from the scene enters an optical cavity; and (b) an initial set of exit pulses exits the cavity. The initial set of exit pulses may occur before the effects of resonance become strong, and thus before the light signal is significantly degraded. Thus, in some implementations: (a) information in an initial set of exit pulses (e.g., all or a subset of the first 100 exit pulses after a pulse of light from the scene enters the OC) is utilized to image the scene; (b) the initial exit pulses occur before the effects of OC resonance become strong; and (c) thus, the effects of OC resonance do not significantly degrade the information about the scene contained in the initial set of exit pulses.

For example, the ToF camera may capture images of only an initial set of exit pulses. Or, data from only an initial set of exit pulses may be used to image the scene, regardless of whether the ToF camera captures data regarding other exit pulses. In some cases, the initial set of exit pulses may comprise all or subset of the first 100 exit pulses that exit the rear STM after a pulse of light from the scene enters the OC. For example, the initial set of exit pulses may comprise: (a) the initial three exit pulses that exit the rear STM after a pulse of light from the scene enters the OC; (b) the initial six exit pulses that exit the rear STM after a pulse of light from the scene enters the OC; (c) the initial twelve exit pulses that exit the rear STM after a pulse of light from the scene enters the OC; or (d) the initial 100 exit pulses that exit the rear STM after a pulse of light from the scene enters the OC. In some cases, the initial set of exit pulses comprises all or a subset of the exit pulses that occur before the integral power of the dominant mode of the OC exceeds half-maximum of the integral power of the evolving wavefront inside the OC.

Figures 2A, 2B, 2C:
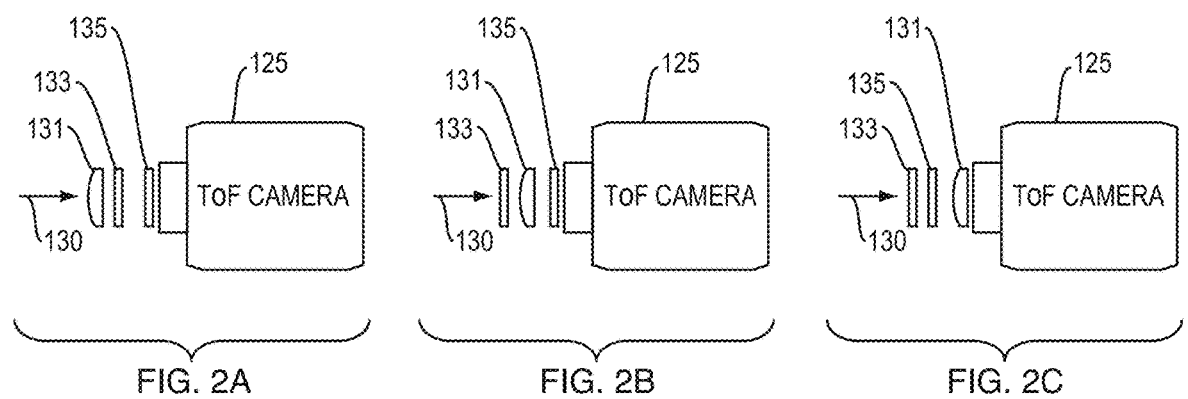
FIG. 2A shows "lens before optical cavity" configuration of optical elements.
FIG. 2B shows a "lens inside optical cavity" configuration of optical elements
FIG. 2C shows a "lens behind optical cavity" configuration of optical elements.

In the examples shown in FIGS. 2A, 2B and 2C: (a) the entrance optics 121 comprise a lens 131, a front semi-transparent mirror (STM) 133, and a rear STM 135; (b) the two STMs together comprise a linear optical cavity (specifically, an FP optical cavity); and (c) light 130 from the scene (e.g., a pulse of light) enters the entrance optics, passes through the entrance optics, and travels to a ToF camera 125.

In some implementations of this invention, the entrance optics 121 comprise optical elements that are arranged in a "lens before optical cavity" configuration, or in a "lens inside optical cavity" configuration, or in a "lens behind optical cavity" configuration.

FIG. 2A shows a "lens before optical cavity" configuration of optical elements, in an illustrative implementation of this invention. In this configuration, the lens 131 is in front of the optical cavity. This configuration may (by folding optical paths inside the optical cavity) allow the physical distance between the lens and ToF camera to be shorter than in a conventional ToF imaging system.

In FIGS. 2A, 2B and 2C, the optical cavity comprises a front STM 133 and a rear STM 135.

FIG. 2B shows a "lens inside optical cavity" configuration of optical elements, in an illustrative implementation of this invention. In this configuration, the lens 131 is inside the optical cavity. This configuration may be employed for multi-zoom imaging.

FIG. 2C shows a "lens behind optical cavity" configuration of optical elements, in an illustrative implementation of this invention. In this configuration, the lens is behind the optical cavity. This configuration may be employed for multi-spectral imaging.

Figure 3:
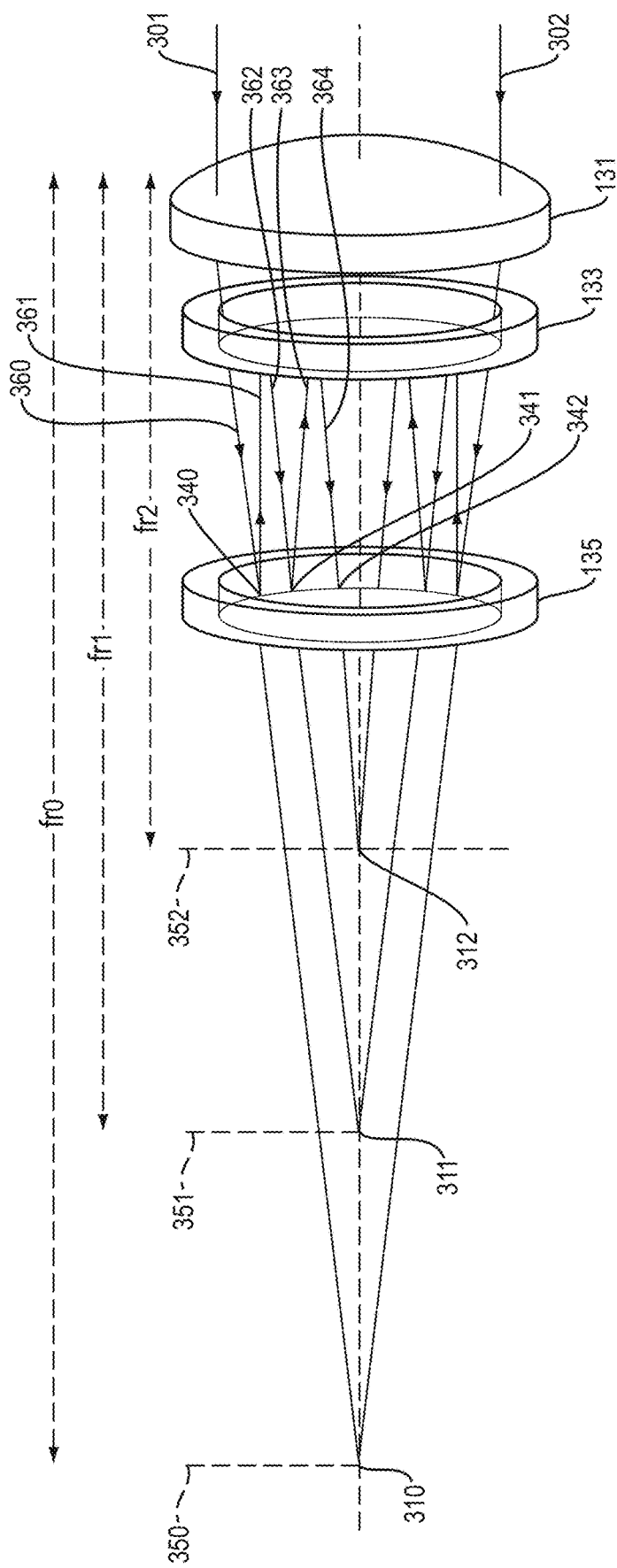
FIG. 3 shows folding of optical paths in an optical cavity.

FIG. 3 shows folding of optical paths in an optical cavity, in an illustrative implementation of this invention. This folding of optical paths may allow a much smaller form factor for a ToF imaging system.

In the example shown in FIG. 3, a "lens before optical cavity" configuration is used. In this configuration: (a) a converging lens 131 is located in front of an optical cavity; and (b) the optical cavity (which is located in optical paths between the lens and the ToF camera and which comprises STMs 133, 135) folds these optical paths. This folding of optical paths inside the cavity may occur during reflections of light inside the cavity, and may allow a ToF camera sensor to be placed at a distance from lens 131 that is much shorter than the nominal focal length of lens 131. For example, in FIG. 3: (a) the ToF camera sensor may be located at geometric plane 352, and (b) this geometric plane 352 is located at a distance from lens 131 that is much shorter than the nominal focal length of lens 131. As used herein, "nominal focal length" of a lens means the focal length of the lens for light which travels along a straight optical path that starts at a point where the light exits the lens and ends at the rear focal plane. In some implementations, the reduced lens/sensor distance is least an order of magnitude less than the nominal focal length of the lens.

In the example shown in FIG. 3: (a) light from a scene passes through lens 131 (e.g., light rays 301, 302 pass through lens 131); (b) lens 131 is plano-convex of biconvex, and thus tends to converge light that passes through it; (c) converging light that exits lens 131 enters an optical cavity by passing through a front STM 133; (d) the optical cavity comprises front STM 133 and rear STM 135; (e) after entering the optical cavity, the light reflects repeatedly inside the optical cavity, back and forth between the front and rear STMs; (f) the rear STM 135 is partially transmissive and partially reflective; (g) each time that incident light strikes the rear STM 135, a portion of the incident light reflects back into the cavity and a portion of the incident light passes through the rear STM, thereby exiting the rear STM; (h) thus, during reflections that occur at the end of the first pass of light in the cavity and at the end of each roundtrip of light in the cavity, respectively, a portion of the light may be transmitted through rear STM 135 and thereby exit the cavity; (i) this escaped light may then travel to the ToF camera; and (j) if a pulse of light passes through lens 131 and enters the cavity, then the light that exits the cavity through the rear STM 135 (after the first pass and after each roundtrip inside the cavity) and then travels to the ToF camera may comprise a temporal sequence of light pulses ("exit pulses"), such that an exit pulse occurs at the end of the first pass and at the end of each roundtrip, respectively.

As a non-limiting example of terminology used herein: in FIG. 3: (a) after light that comprises light ray 301 enters the optical cavity, it travels on a path that is folded inside the cavity, such that the path includes a first pass inside the cavity, then a first roundtrip in the cavity, and then a second roundtrip in the cavity, and so on; (b) the first pass comprises path 360 from the front STM 133 to point 340 in the rear STM 135; (c) the first roundtrip comprises path 361 from point 340 in the rear STM 135 to the front STM 133 and then path 362 from the front STM 133 to point 341 in the rear STM 135; and (d) the second roundtrip comprises path 363 from point 341 in the rear STM 135 to the front STM 133 and then path 364 from the front STM 133 to point 342 in the rear STM 135. The examples in the preceding sentence are non-limiting examples. For instance, they are not the only first pass, first roundtrip and second roundtrip that occur in FIG. 3, and FIG. 3 itself is a non-limiting example.

In FIG. 3, light rays in the optical cavity that are traveling toward the rear STM 135 are aligned such that (if they were to pass through the rear STM 135) they would focus at different rear focal planes, depending on which round trip immediately preceded their exit from the cavity. In FIG. 3, the more roundtrips that occur before a portion of light exits the cavity, the closer the rear focal plane for that portion of light is to lens 131. Thus, one may control the lens/ToF camera distance by placing a ToF camera at a rear focal plane that corresponds to a given roundtrip of light (or to the first pass of light) in the optical cavity.

In FIG. 3, the portion of light that exits through rear STM 135 after a first pass inside the optical cavity is oriented such that it is focused at rear focal plane 350. For example, light that travels in a first pass along path 360 and exits the cavity at the end of the first pass is focused on rear focal plane 350, and intersects that plane at point 310. Rear focal plane 350 is located at distance fr0 from lens 131, which is equal to the nominal focal distance f0 of lens 131.

Likewise, in FIG. 3, the portion of light that exits through the rear STM 135 after a first roundtrip inside the optical cavity is oriented such that it is focused at rear focal plane 351. For example, light that travels in a first roundtrip along path 362 and exits the cavity at the end of the first roundtrip is focused on rear focal plane 351, and intersects that plane at point 311. Rear focal plane 351 is located at distance fr1 from lens 131, which is less than fr0 and f0; that is, fr1<fr0=f0.

Likewise, in FIG. 3, the portion of light that exits through the rear STM 135 after a second roundtrip inside the optical cavity is oriented such that it is focused at rear focal plane 352. For example, light that travels in a first roundtrip along path 364 and exits the cavity at the end of the second roundtrip is focused on rear focal plane 352, and intersects that plane at point 312. Rear focal plane 352 is located at distance fr2 from lens 131, which is less than fr1; that is, fr2<fr1<fr0=f0.

In the example shown in FIG. 3, if a ToF camera is located at plane 352, then light will arrive at the camera at different times, depending on whether it exited the optical cavity after the first pass, the first roundtrip or the second roundtrip. Specifically, in FIG. 3, if a ToF camera is located at plane 352, then: (a) light that exits the optical cavity after the first pass will reach the camera earlier than will light that exits the cavity after the first roundtrip; and (b) light that exits the optical cavity after the first roundtrip will reach the camera earlier than will light that exits the cavity after the second roundtrip.

In the example shown in FIG. 3, if a ToF camera is located at plane 352 at distance fr2 from the lens 131, then the light incident on the ToF camera: (a) will appear focused if it exited the optical cavity at the end of the second roundtrip, and (b) will appear unfocused if it exited the optical cavity at the end of the first pass or first roundtrip in the cavity. In FIG. 3, the ToF camera has a temporal resolution that is less than t3 minus t2, and thus: (a) the ToF camera can distinguish light that exited the cavity at the end of the second roundtrip from light that exited at the end of other roundtrips or at the end of the first pass; and (c) thus, the ToF camera can (by measuring light that exited the cavity at the end of the second roundtrip) image the scene without a loss of spatial resolution. For purposes of this paragraph, if a pulse of light from the scene enters the optical cavity and reflects repeatedly inside the cavity, traveling in a first pass, first roundtrip, second roundtrip, and so on in the cavity, then: (a) t3 is the time at which a third exit pulse reaches plane 352; and (b) t2 is the time at which a second exit pulse reaches plane 352 In the example shown in FIG. 3, the duration of a roundtrip in the cavity is equal to t3−t2.

In FIG. 3, the first, second and third exit pulses comprise light pulses that exit the optical cavity at the end of the first pass, first roundtrip and second roundtrip, respectively, of light in the cavity.

In FIG. 3, if a ToF camera is placed at distance fr2 from the lens and has a temporal resolution (e.g., shutter speed)) that is faster than the duration of a roundtrip of light in the optical cavity (or has a depth resolution that is finer than the roundtrip length of the cavity), then the camera may resolve the scene with no loss of spatial information.

Figure 6A:
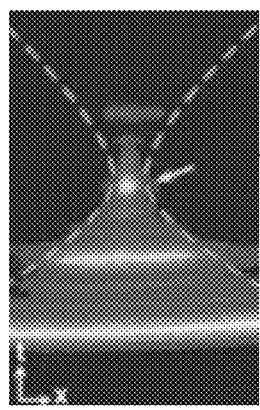
FIG. 6A comprises an x-t streak image of a point source of light.

In FIG. 3, if a ToF streak camera that captures x-t images is located at plane 352 and the scene being imaged comprises a point source of light, then the streak camera may capture an x-t image that shows an unfocused first streak of light that corresponds to a first exit pulse from the optical cavity, an unfocused second streak of light that corresponds to a second exit pulse from the cavity, and a focused point of light that corresponds to the third exit pulse from the cavity. The first streak, second streak and focused point of light will appear at different positions along the t (time) axis of the x-t image because they correspond to light that arrived at the streak camera at different times. An example of this is shown in FIG. 6A.

In some cases, in an optical configuration such as that shown in FIG. 3: (a) the optical distances that light travels from the scene to points 310, 311 and 312, respectively, are identical (due to folding of optical path inside the optical cavity); and (b) thus a pulse of light from the scene that enters the optical cavity will reach points 310, 311, 312 at the same instant of time. Note: FIG. 3 is not drawn to scale.

In some implementations of this invention, compression of the lens/sensor distance (and thus a smaller form factor for the imaging system) is achieved as follows: (a) a "lens before optical cavity" configuration is employed, in which light from a scene passes through a converging lens, then through an optical cavity, and then travels to a ToF camera; (b) the ToF camera sensor is located at a geometric plane at which light (that passes through the lens, is folded in the optical cavity, and exits the cavity at the end of a given roundtrip of light in the cavity) is focused; (c) the physical Euclidean distance between the lens and the geometric plane is less than the nominal focal length of the lens; (d) the ToF camera has a temporal resolution that is less than the duration of a roundtrip of light in the cavity; and (e) the ToF camera captures an image of the scene without loss of spatial resolution (as compared to the spatial resolution that would exist if the ToF camera were located at a distance from the lens equal to the nominal focal length of the lens.)

In a prototype of this invention, compression of the lens/sensor distance was achieved by a "lens before optical cavity" configuration. In this prototype: (a) an achromatic doublet 2" lens with a focal length of 15 cm is placed in front of two 2" O.D. 1.3 reflective ND filters; (b) the ND filters comprise an optical cavity; (c) light that passes through the lens is converging as it enters the cavity; (d) during each round trip in the cavity, some of the light will exit and will be measured by a ToF camera; and (e) the light travels a different distance with each round trip and is focused on a different plane.

In another prototype of this invention, compression of the lens/sensor distance was also achieved by a "lens before optical cavity" configuration. In this other prototype, a long focal length (25 cm) convex lens was placed in front of a streak camera at a distance of 10 cm. This short distance between the streak camera and lens would cause a conventional camera to capture an unfocused image. However, in this prototype, the streak camera captured a sharp focused image of a point source of light.

The prototypes described in the preceding two paragraphs are non-limiting examples of this invention. This invention may be implemented in many other ways.

In many implementations, it is desirable to compress the lens/sensor distance by employing a "lens before optical cavity" configuration. For example, compression of the lens-sensor distance may be strongly desired for applications where space and weight translates to cost or limitation of mobility. Spatial compression of the lens tube may also promote practical use of large diameter long focal length lenses, because (in some cases in which a "lens before optical cavity" configuration is employed), the compression may be achieved without any telephoto lens group or non-coaxial catadioptric lens systems.

Figure 4:
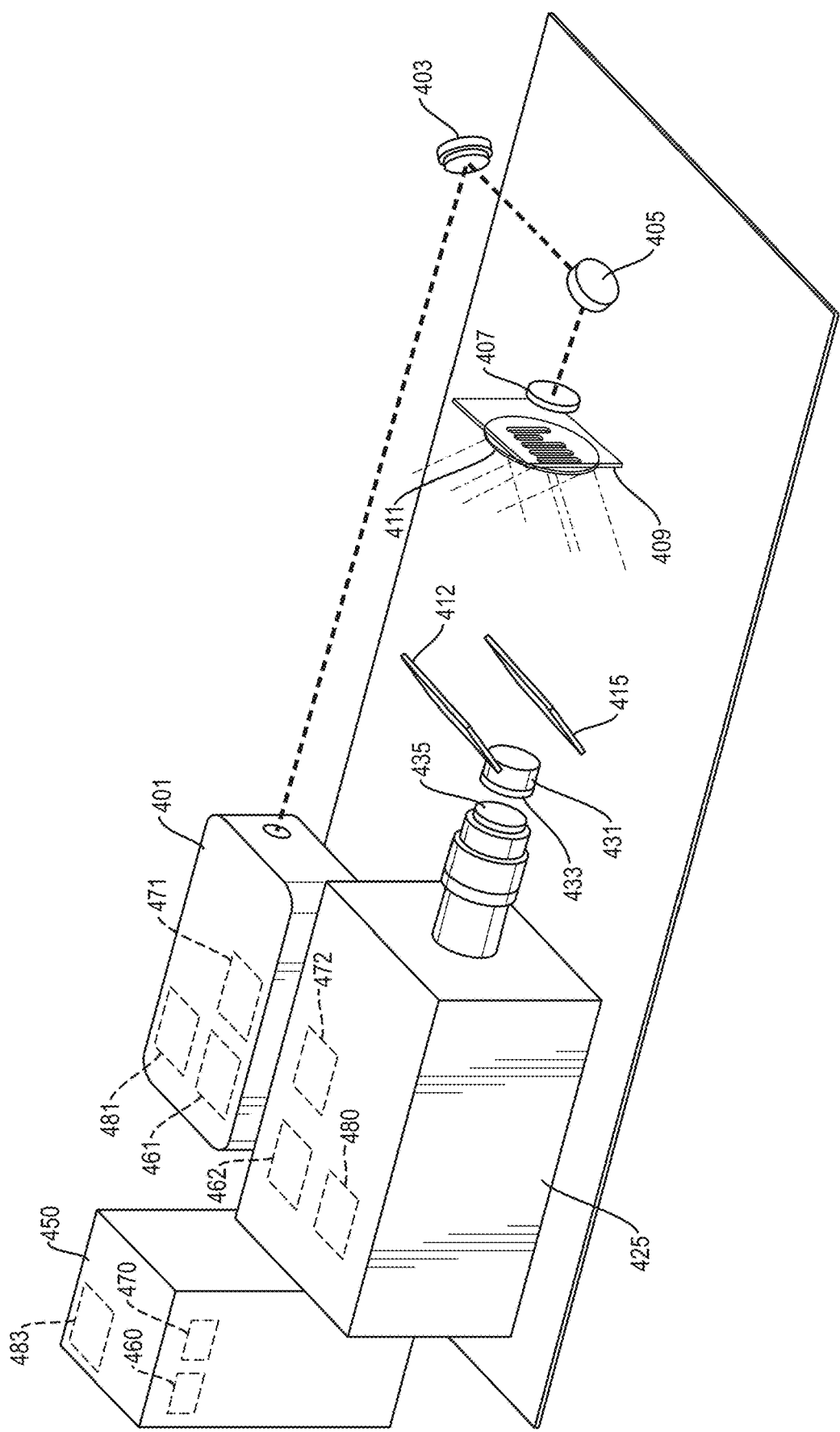
FIG. 4 shows another example of hardware of a ToF imaging system.

FIG. 4 shows an example of hardware of a ToF imaging system, in an illustrative implementation of this invention. In FIG. 4: (a) a "lens before optical cavity" configuration is employed; and (b) the optical cavity folds optical paths of light, thereby allowing compression of the lens/sensor distance (and thus a smaller form factor for the imaging system).

In FIG. 4, a pulsed laser 401 (Ti-Sapphire 780 nm 80 MHz rep. rate and 30 fs pulse width) illuminates a scene. Pulses of the laser are synchronized with image acquisition by a streak camera 425 (Hamamatsu® C5680). An achromatic doublet lens 431 with 15 cm focal length is positioned in front of an optical cavity. The optical cavity comprises two semi-reflective, O.D. 1.3, neutral density (ND) filters 433, 435 that are facing each other.

In the example shown in FIG. 4, a pulse of laser light from the laser 401 is steered by mirror 403, then steered by mirror 405, then expanded by beam expander 407, then diffused by diffuser 409, and then passes through mask 411. This mask 411 comprises the scene that is imaged by streak camera 425. After the pulse of light passes through the mask 411, the pulse is steered by periscope mirrors 415 and 412, then passes through lens 431, then passes through an optical cavity that comprises ND filters 433 and 435, and then travels to ToF camera 425. A portion of the light reflects repeatedly in the optical cavity, before exiting the cavity and traveling to the streak camera 425. A timer 483 outputs a signal that triggers the laser 401 to emit a laser pulse to illuminate the scene and triggers the streak camera 425 to acquire a streak image of the scene, such that the laser pulse and image acquisition are synchronized. Memory devices 460, 461 and 462 are housed in the computer 450, laser 401 and streak camera 425, respectively. In some cases, data and instructions are transmitted by wired connections among the computer 450, laser 401 and streak camera 425. In some cases, the computer 450, laser 401 and streak camera 425 include wireless communication modules 470, 471, 472, respectively, and employ these modules for wireless communication withe each other or with other devices. Computer 450 controls and receives data from microcontrollers 480, 481 located in streak camera 425 and laser 401, respectively.

In the example shown in FIG. 4: (a) the streak camera captures an x-t image that measures spatial information in only one dimension (x); and (b) the set of periscope mirrors scans they dimension to obtain an x-y-t data cube. Alternatively, one may avoid the y-scan by using a 2D single-photo-avalanche diode array (SPAD) camera or by using lenslet arrays to have 2D image acquisition.

Figure 5A:
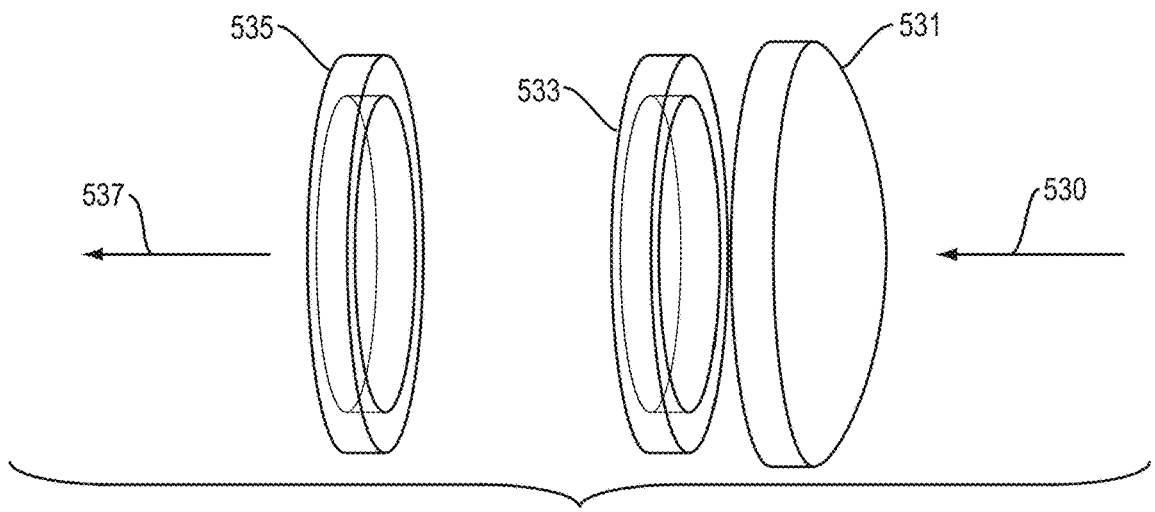
FIG. 5A shows another example of a "lens before optical cavity" configuration of optical elements.
Figure 5B:
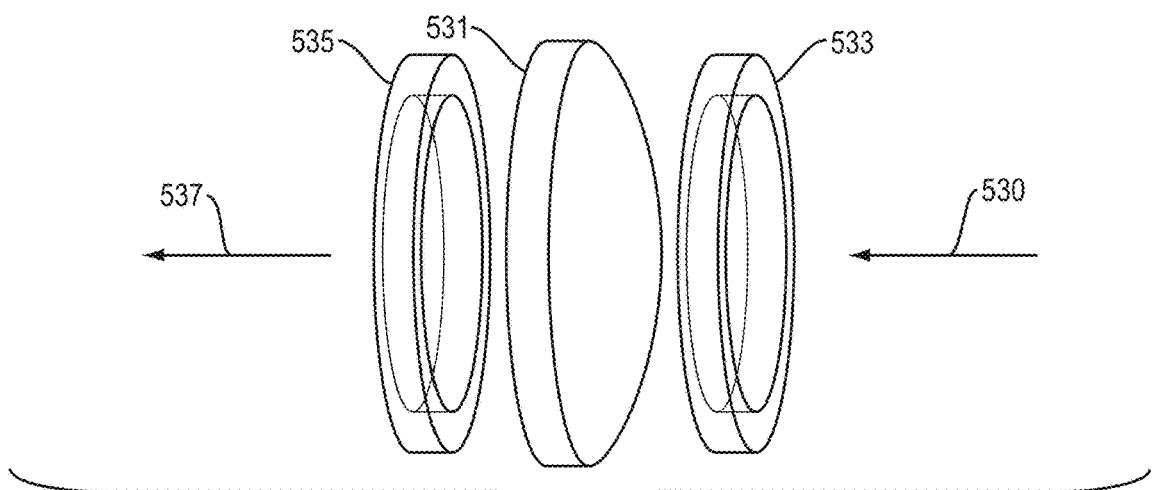
FIG. 5B shows another example of a "lens inside optical cavity" configuration of optical elements.
Figure 5C:
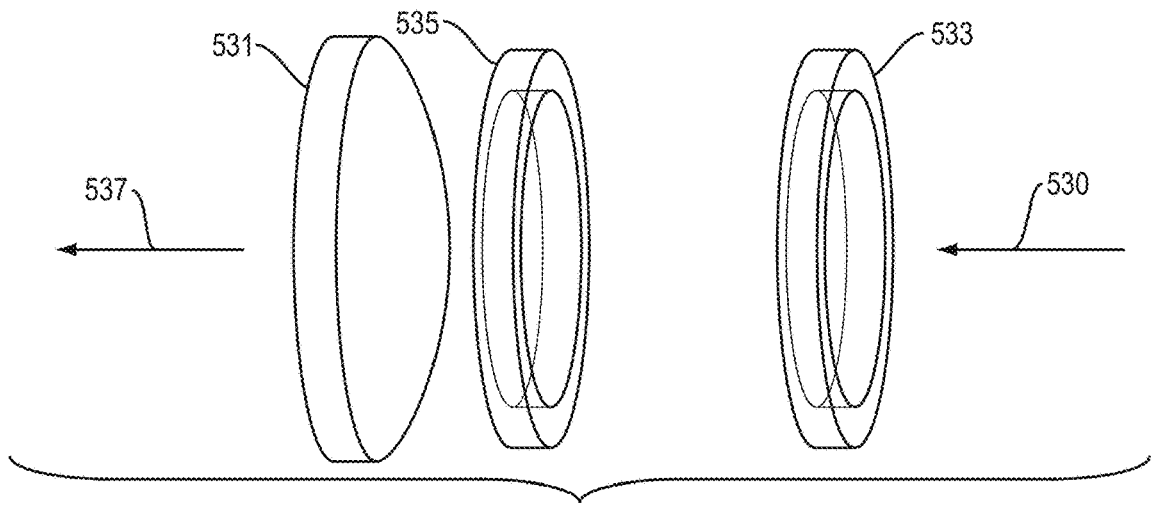
FIG. 5C shows another example of a "lens behind optical cavity" configuration of optical elements.

In the examples shown in FIGS. 5A, 5B and 5C: (a) the entrance optics comprise a lens 531, a front ND filter 533, and a rear ND filter 535; (b) the two ND filters together comprise a FP linear optical cavity; and (c) light 530 from the scene enters the entrance optics, passes through the entrance optics, and then travels to a ToF camera 125. Light 537 is the light as it travels from the entrance optics toward the ToF camera.

FIG. 5A shows an example of a "lens before optical cavity" configuration of optical elements, in an illustrative implementation of this invention. In FIG. 5A, lens 531 is located in front of an optical cavity, which comprises two ND filters 533, 535. The "lens before optical cavity" configuration shown in FIG. 5A may be employed to shorten the physical distance between the lens and ToF camera sensor, and thereby achieve a smaller form factor for the ToF imaging system.

FIG. 5B shows an example of a "lens inside optical cavity" configuration of optical elements, in an illustrative implementation of this invention. In FIG. 5B: (a) lens 531 is located inside an optical cavity; and (b) the optical cavity comprises two ND filters 533, 535. The "lens inside optical cavity" configuration shown in FIG. 5A may be employed for ultrafast multi-zoom imaging.

In a prototype of this invention, a "lens inside optical cavity" configuration is employed for multi-zoom imaging. In this prototype: (a) an achromatic doublet 2" lens with a focal length of 15 cm is placed in between two 2" O.D. 1.3 reflective ND filters; (b) the ND filters comprise an optical cavity; (c) light enters the cavity and passes repeatedly through the lens; (d) during (or at the end of) each round trip of light in the cavity, a portion of the light exits the cavity and is measured by a ToF camera. Within the optical cavity, a portion of the light passes through the lens repeatedly, amplifying the focusing effect of the lens. The prototype described in this paragraph is a non-limiting example of this invention; this invention may be implemented in many other ways.

FIG. 5C shows an example of a "lens behind optical cavity" configuration of optical elements, in an illustrative implementation of this invention. In FIG. 5C: (a) lens 531 is located behind an optical cavity; and (b) the optical cavity comprises two ND filters 533, 535. The "lens behind optical cavity" configuration shown in FIG. 5C may be employed for ultrafast multi-spectral imaging.

In a prototype of this invention, a "lens behind optical cavity" configuration is employed for multi-spectral imaging. In this prototype: (a) a convex 2" lens with a focal length of 7.5 cm is placed behind an optical cavity that comprises a 2" O.D. 1.3 reflective ND filter and a 2" O.D. 1.0 reflective filter; (b) light enters the optical cavity and exits through the lens that is focused on the camera; and (c) each round trip in the cavity adds a delay to the signal that exits. The "lens behind optical cavity" configuration shown in FIG. 5C may be employed for ultrafast multi-spectral imaging.

FIGS. 6A, 6B, 6C, and 6D are images captured by a streak camera (or are created by post-processing of images captured by a streak camera), in an illustrative implementation of this invention. The imaging system that captured the streak images shown in FIGS. 6B, 6C, and 6D employed a "lens before optical cavity" configuration, in order to reduce lens/sensor distance and thereby to achieve a smaller form factor. For the x-t streak images shown in FIGS. 6A, 6B, and 6C, the vertical axis is t (time) and time increases from the bottom to the top of the x-t image.

As used herein: (a) "first pass light" means light that exits an optical cavity at the end of a first roundtrip of light in the cavity; (b) "first roundtrip light" means light that exits an optical cavity at the end of a first roundtrip of light in the cavity; (c) "second roundtrip light" means light that exits an optical cavity at the end of a second roundtrip of light in the cavity; (d) "third roundtrip light" means light that exits an optical cavity at the end of a third roundtrip of light in the cavity; (e) "fourth roundtrip light" means light that exits an optical cavity at the end of a fourth roundtrip of light in the cavity; and (f) "fifth roundtrip light" means light that exits an optical cavity at the end of a fifth roundtrip of light in the cavity;

FIG. 6A comprises an x-t streak image 601 of a scene that comprises a point source of light. The streak camera that captured the streak image shown in FIG. 6A was positioned at the geometric plane at which second-roundtrip light is focused. In FIG. 6A: (a) the lowest prominent streak of the streak image is an image (of the point source) that is unfocused in the x dimension and that is created by first pass light; (b) the second lowest, prominent streak in the streak image is an image (of the point source) that is unfocused in the x dimension and that is created by first roundtrip light; and (c) the point of light in the middle of the streak image is a focused image (of the point source) that is formed by second roundtrip light.

Figure 6B:
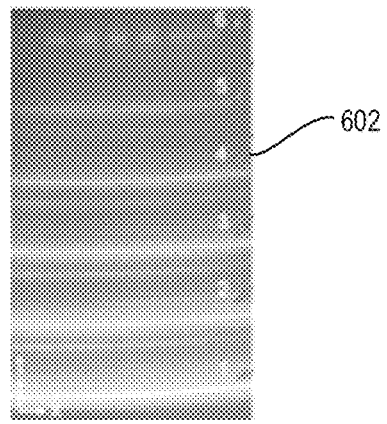
FIG. 6B comprises an x-t streak image of an illuminated mask.
Figure 6C:
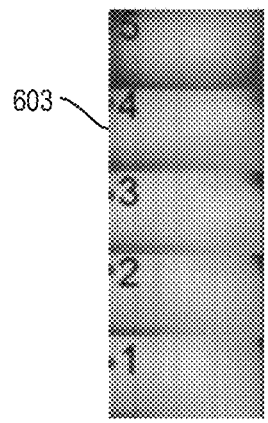
FIG. 6C comprises five different, unfocused, x-y images of the same mask.
Figure 6D:
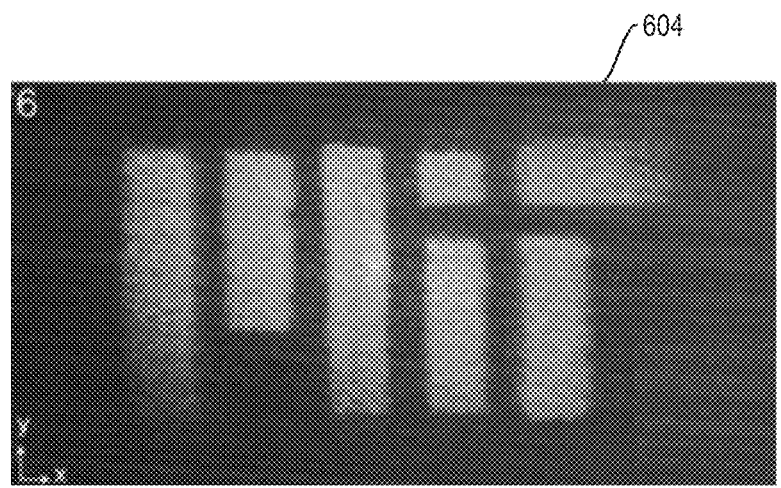
FIG. 6D comprises a focused x-y image of the same mask.

The streak camera that captured the streak images shown in FIGS. 6B, 6C and 6D was positioned at the geometric plane at which fifth-roundtrip light is focused.

FIG. 6B comprises an x-t streak image 602 of an illuminated mask. The five long, prominent streaks of light in the streak image are images (of the mask) that are unfocused in the x dimension and that were created by first pass light, first roundtrip light, second roundtrip light, third roundtrip light and fourth roundtrip light, respectively. The dashed line at the top of the streak image is a focused image of the mask that is formed by fifth roundtrip light.

FIG. 6C comprises five different, unfocused, x-y images 603 of a mask. The five images are so unfocused that the details of the mask are not discernible. In FIG. 6C, the five unfocused images are formed by first pass light, first roundtrip light, second roundtrip light, third roundtrip light and fourth roundtrip light.

Figure 7:
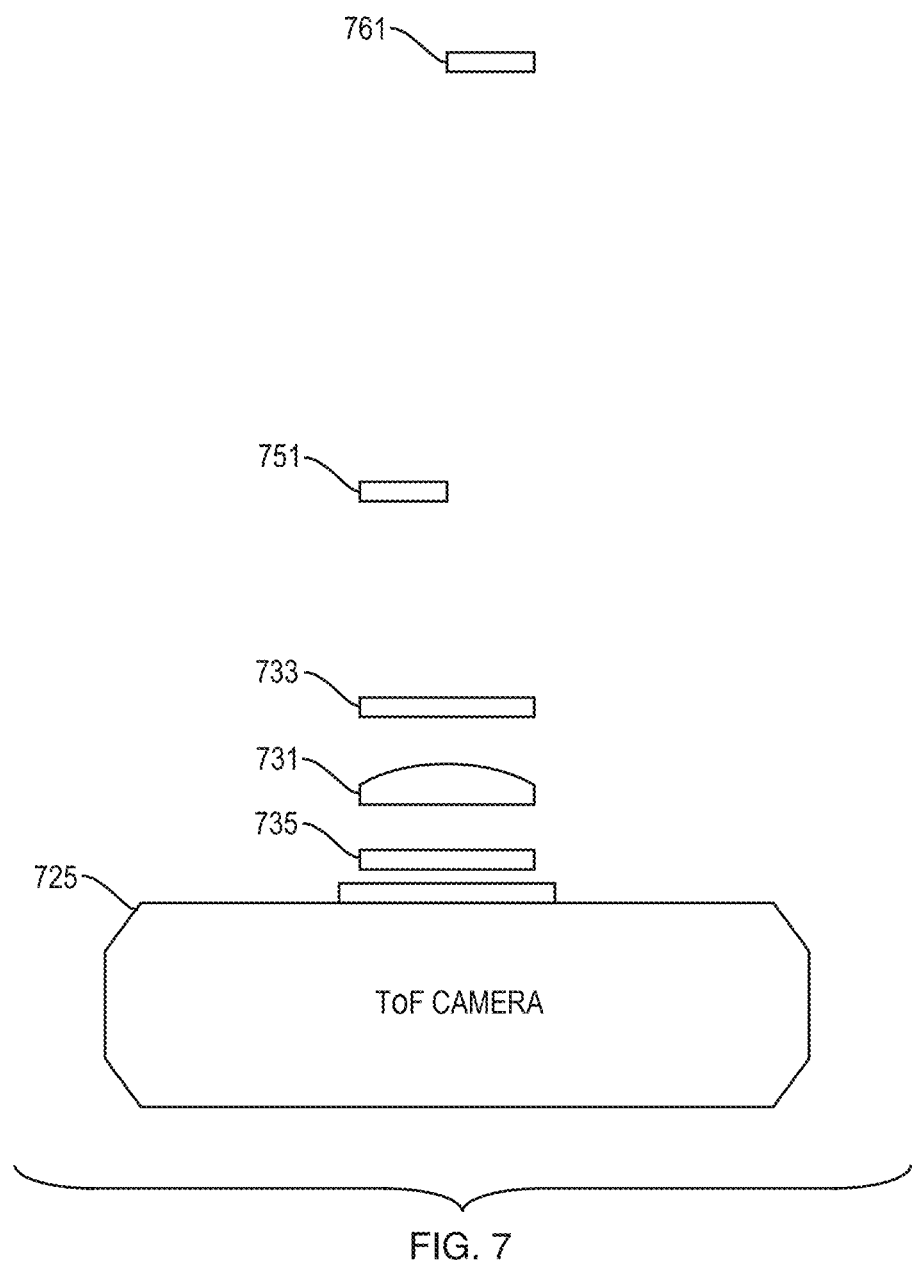
FIG. 7 shows a top view of a multi-zoom ToF imaging system.

FIG. 6D shows a focused x-y image 604 of the same mask (which spells the letters "MIT"). In FIG. 6D, the focused image is formed by fifth roundtrip light FIG. 7 shows a top view of a multi-zoom ToF imaging system, in an illustrative implementation of this invention. In FIG. 7, a "lens inside optical cavity" configuration enables ultrafast, multi-zoom imaging.

In the example shown in FIG. 7, the optical cavity comprises STM 733 and STM 735. This optical cavity is located in front of a ToF camera 725. Lens 731 is located inside the optical cavity. After light from the scene enters the cavity, light passes through lens 731 (which is inside the cavity) repeatedly, such as during the first pass of light inside the cavity and during each roundtrip of light inside the cavity, respectively. As light reflecting inside the cavity passes through lens 731 repeatedly, the light is further diffracted during each pass of light through lens 731. Thus, each pass of light through lens 731 causes an optical system (comprising the lens 731 and optical cavity) to be focused at a different depth of the scene, because each pass of light through the lens changes the convergence or divergence of the wavefront.

In FIG. 7, lens 731 (which is inside the optical cavity formed by STM 733 and STM 735) enables the ToF camera 725 to function as multi-zoom ultrafast camera that is configured to focus on two or more focal planes at different depths (e.g., depths that differ by an order of magnitude or more) with different magnification factors. For example, in FIG. 7, the ToF camera 725 employs the same lens 731 to focus on object 751 and to focus on object 761 (even though they are at different scene depths), without physically moving any optical element and without changing the shape of any lens. In FIG. 7, the ToF camera may capture a multi-zoom image in a single ultrafast acquisition frame using a single set of optical elements, without physically altering the focal length of the lens and without physically moving any optical element.

In FIG. 7, the focal length of lens 731 is larger than the optical cavity size, in order to increase the stability of the cavity in the initial roundtrips.

In some implementations (in which a "lens inside optical cavity" configuration is used for multi-zoom imaging), increasing the number of roundtrips in the optical cavity (before a portion of light exits the cavity): (a) tends to reduce the scene depth at which the ToF camera is focused in an image formed by that portion of light; and (b) tends to increase the magnification of that image.

The following paragraph is a description of a prototype of this invention.

In this prototype, the configuration shown in FIG. 7 was employed (keep in mind that FIG. 7 is not drawn to scale). In this prototype: (a) lens 731 had a nominal focal length of 15 cm; (b) the optical cavity size (distance between front STM 733 and rear STM 735) was 4 cm; (c) object 751 was located 4 cm in front of lens 731; and (d) object 761 was located 55 cm in front of lens 731. In this prototype, ToF camera 725 comprised a streak camera. The streak camera captured two focused images—a first image of a more distant object 761 and a second image of closer object 751—using the same lens 731 and without moving any physical optical elements and without changing the shape of any lens. The first image (of distant object 761) was formed by first roundtrip light and the second image (of close object 751) was formed by second roundtrip light. The magnification in the second image (of close object 751) was approximately four times greater than the magnification in the first image (of distant object 761). In this prototype, there was a large temporal separation (hundreds of picoseconds) between the time of arrival at the streak camera of the light that created the first and second images, respectively, and thus there was no artifact or trace from the first image onto the second image.

The prototype described in the preceding paragraph is a non-limiting example of this invention; this invention may be implemented in many other ways.

In some implementations, multi-zoom acquisition may be advantageous in imaging (e.g., microscopy or remote sensing) where one wants to see the entire field to find the region of interest faster while holding onto the details of the zoomed-in image during the same acquisition with no mechanical movements of lenses.

Figure 18A:
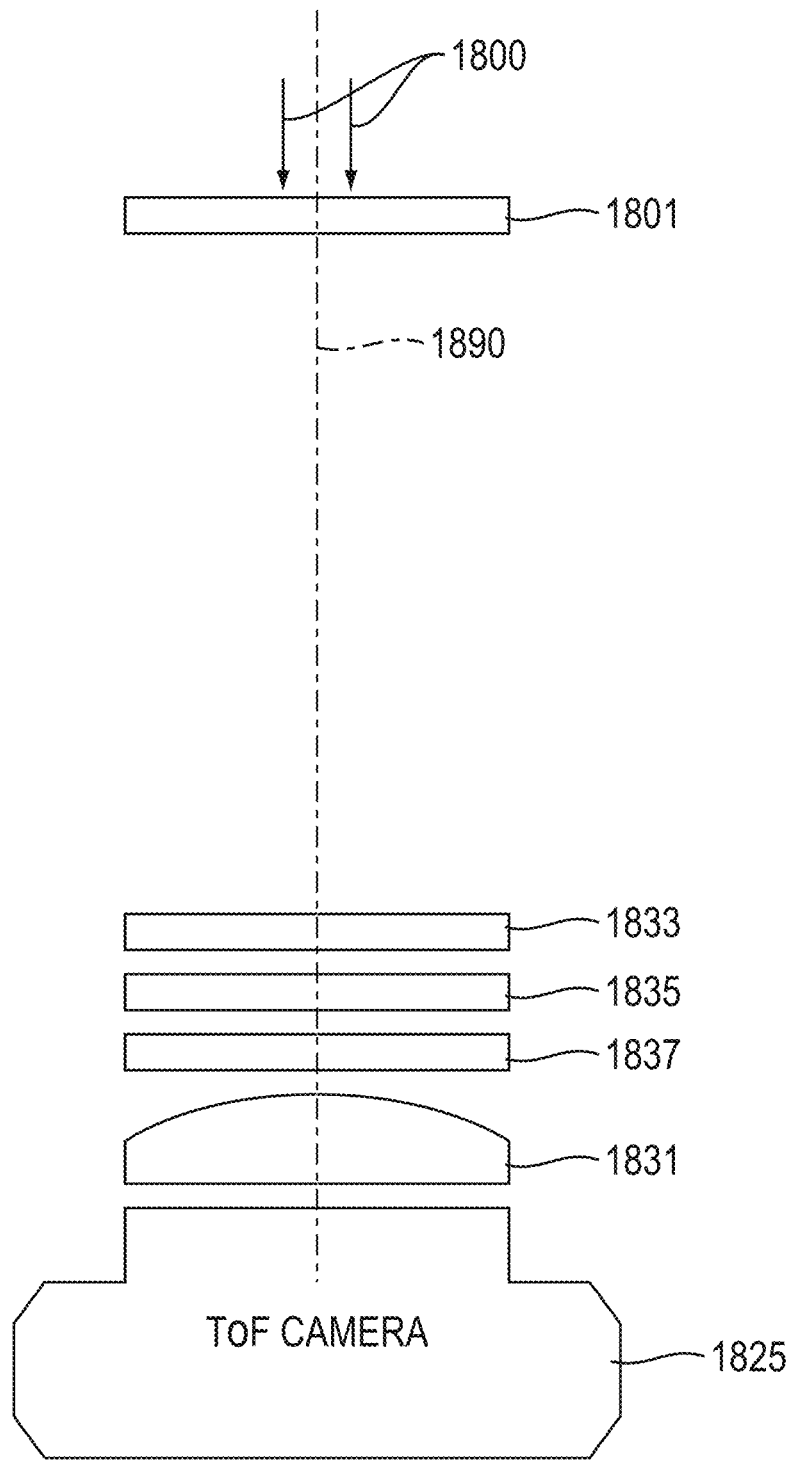
FIG. 18A shows a top view of another multi-spectral ToF imaging system.

FIG. 18A shows a top view of a multi-spectral ToF imaging system, in an illustrative implementation of this invention. In FIG. 18A, a set of optical cavities enables ultrafast, multi-spectral imaging by time-encoding different spectral signals.

In the example shown in FIG. 18A, an ND filter and multiple notch filters create a set of optical cavities. The notch filters may be positioned in a "stack", one in front of the other, such that they have a uniaxial configuration (share a common axis).

In FIG. 18A, four filters 1801, 1833, 1835, 1837, a lens 1831 and a ToF camera 1825 share a common optical axis 1890.

Figure 18B:
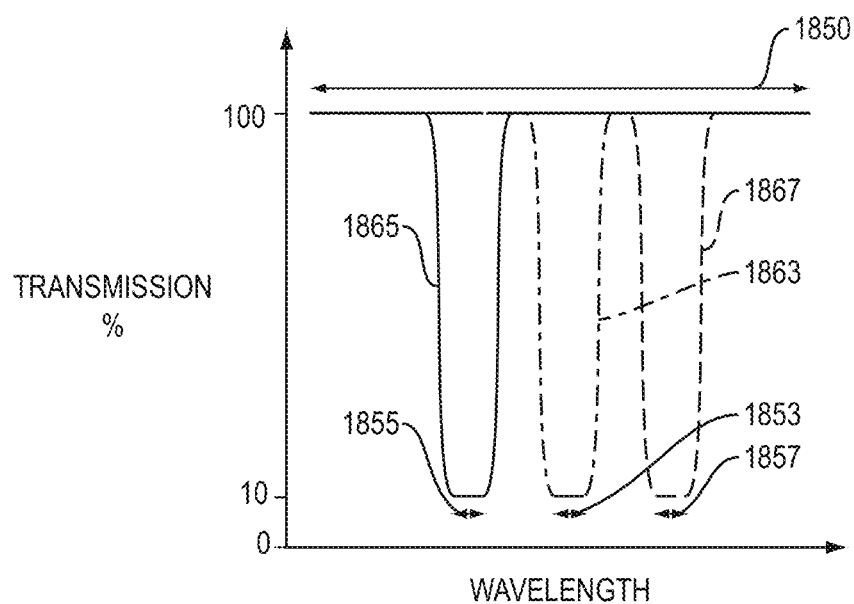
FIG. 18B and FIG. 18C are charts that show transmission and reflectance, respectively, for this other multi-spectral system.
Figure 18C:
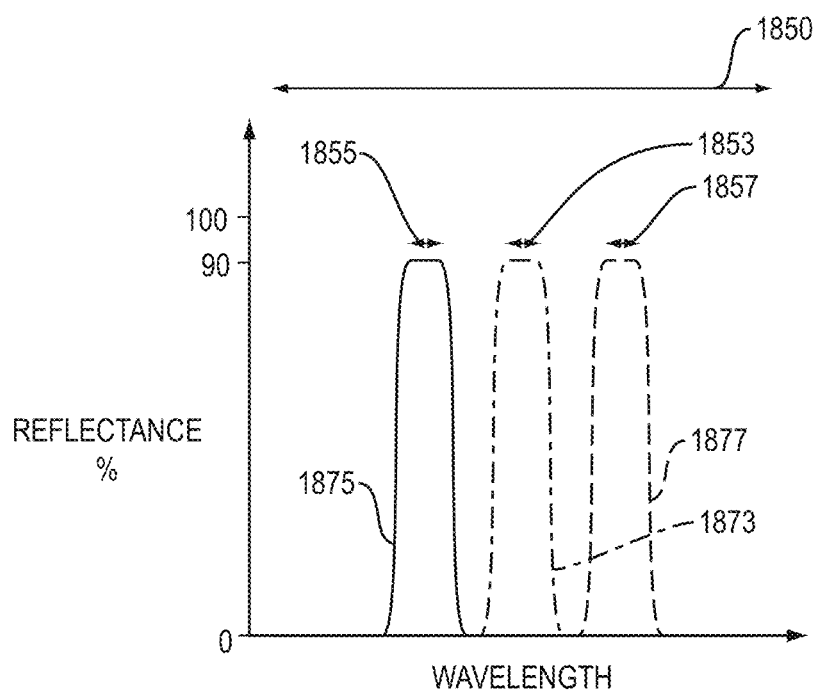

In the example shown in FIGS. 18A, 18B and 18C, multi-spectral light 1800 from the scene enters a broadband ND filter 1801 that transmits light in a broad band 1850 of light. Then the light transmits through three notch filters

1833, 1835, 1837. Each of these notch filters, 1833, 1835, 1837 transmits substantially all incident light in frequencies in broad band 1850, except for a notch (subband) of frequencies. There is a different subband for each notch filter. Specifically, filter 1833 reflects a majority of incident light in subband 1853 and transmits a minority of incident light in subband 1853. Filter 1835 reflects a majority of incident light in subband 1855 and transmits a minority of incident light in subband 1855. Filter 1837 reflects a majority of incident light in subband 1857 and transmits a minority of incident light in subband 1857.

In FIG. 18A, the notch filters 1833, 1835 and 1837 are spectral filters. The amount of light that they each reflect or transmit depends on the frequency of light incident on them.

FIG. 18B and FIG. 18C are charts that show an example of transmittance and reflectance, respectively, for these three notch filters in this multi-spectral system. In FIG. 18B, lines 1863, 1865, 1867 represent light that is transmitted by filters 1833, 1835 and 1837, respectively. These lines 1863, 1865, 1867 overlap at many wavelengths, as shown near the top of FIG. 18B. Likewise, in FIG. 18C, lines 1873, 1875, 1877 represent light that is reflected by filters 1833, 1835 and 1837, respectively. These lines 1873, 1875, 1877 overlap at many wavelengths, as shown at the bottom of FIG. 18C.

In the example shown in FIGS. 18A, 18B and 18C, filters 1833, 1835 and 1837 each transmit substantially all incident light in frequencies in broad band 1850, except for a notch (subband) of frequencies. The notch is different for each of these three filters 1833, 1835, 1837. For example, filter 1833: (a) reflects 90% of incident light in subband 1853; (b) transmits 10% of incident light in subband 1853, and (c) transmits substantially all incident light in the remainder of the broad band 1850 (including substantially all incident light in subbands 1855 and 1857). Likewise, filter 1835: (a) reflects 90% of incident light in subband 1855; (b) transmits 10% of incident light in subband 1855, and (c) transmits substantially all incident light in the remainder of the broad band 1850 (including substantially all incident light in subbands 1853 and 1857). Likewise, filter 1837: (a) reflects 90% of incident light in subband 1857; (b) transmits 10% of incident light in subband 1857, and (c) transmits substantially all incident light in the remainder of the broad band 1850 (including substantially all incident light in subbands 1853 and 1855).

For clarity of presentation, the examples in FIGS. 18B and 18C assume that the internal absorbance of the filters is zero. However, in actual practice, internal absorbance of the filters may be non-zero.

FIGS. 18B and 18C are non-limiting examples. This invention is not limited to the percentages of transmitted light and reflected light shown in FIGS. 18B and 18C.

In the example shown in FIG. 18A, the ND filter 1801 and the three notch filters 1833, 1835, 1837 form three optical cavities. Specifically, filter 1801 and filter 1833 comprise a first optical cavity. Filter 1801 and filter 1835 comprise a second optical cavity. Filter 1801 and filter 1837 comprise a third optical cavity.

These three optical cavities have different sizes. Specifically, the filter-to-filter distance for the first optical cavity is shorter than that of the second optical cavity, which is shorter than that of the third optical cavity.

Thus, the roundtrip distance (and temporal duration of a roundtrip) inside each of these three cavities is different. Specifically, the roundtrip distance (and temporal duration of a roundtrip) for the first optical cavity is shorter than that of the second optical cavity, which is shorter than that of the third optical cavity.

As a non-limiting example, if subbands 1853, 1855 and 1857 are green, blue, and red light, respectively, then: (a) a portion of the green light that enters the first optical cavity (comprising ND filter 1850 and filter 1833) will reflect repeatedly in the first optical cavity; (b) a portion of the blue light that enters the second optical cavity (comprising ND filter 1850 and filter 1835) will reflect repeatedly in the second optical cavity; and (c) a portion of the red light that enters the third optical cavity (comprising ND filter 1850 and filter 1837) will reflect repeatedly in the third optical cavity.

However, each time that light is incident on filters 1833, 1835, 1837, respectively, a portion of the light will be transmitted and travel to lens 1831 and ToF camera 1825. This is because filters 1833, 1835 and 1835 transmit almost all light outside of their respective notches (subbands) and transmit a minority of light even in their respective notch (subband).

In illustrative implementations, the three optical cavities have different sizes and thus different roundtrip distances. Because the optical cavities have different sizes (roundtrip distances), they time-encode spectral information.

For example, in FIG. 18A, if an impulse of multi-spectral light from the scene strikes the ND filter 1801, then different subbands of frequencies will be time-encoded, in that they will arrive at the ToF camera at different times.

As a non-limiting example, if subbands 1853, 1855 and 1857 are green, blue, and red light, respectively, then in response to an impulse of multi-spectral light from the scene striking the ND filter 1801: (a) a set of exit pulses of green light would exit the first optical cavity, then travel through filters 1835 and 1837, then travel through lens 1831, and arrive at ToF camera 1825; (b) a set of exit pulses of blue light would exit the second optical cavity, then travel through filter 1837, then travel through lens 1831, and arrive at ToF camera 1825; (c) a set of exit pulses of red light would exit the third optical cavity, then travel through lens 1831, and arrive at ToF camera 1825; (d) the earliest of the green exit pulses would arrive at ToF camera 1825 before the earliest of the blue exit pulses; (e) the earliest of the blue exit pulses would arrive at ToF camera 1825 before the earliest of the red exit pulses; and (f) ToF camera 1825 would have a sufficiently fast temporal resolution to distinguish between the earliest blue, green and red exit pulses, respectively. In the example described in the preceding sentence: (a) the different-sized optical cavities would cause spectral information to be time-encoded, by causing green, blue and red exit pulses, respectively, to arrive at ToF camera 1825 at different times; and (b) these different times would be resolvable by ToF camera 1825 due to its fast temporal resolution.

In some implementations, a set of notch filters may be at different distances from an ND filter, and thus they may create different size optical cavities and may encode each center wavelength to a different time. Thus, the ToF camera may measure each selected frequency at a different time offset. In the x-y-t datacube the different spectral images may exist on different time planes. The number of notch filters to use may depend on the number of spectral images desired.

The uniaxial design shown in FIG. 18A has many advantages. Among other things, the uniaxial design is easy to scale. For example, in some cases, more notch filters may be added (behind or in front of those shown in FIG. 18A) to measure for additional wavelengths without the need to change any framing of the lens tube. Also, using three notch filters at red, green, and blue, respectively, may allow a ToF camera to capture ultrafast, single acquisition, color ToF images. Such color images may be desirable in many applications, including ultrafast fluorescence lifetime imaging. Furthermore, as compared to the "side-by-side" design shown in FIG. 8 (discussed below), the uniaxial design in FIG. 18A: (a) may tend to be more robust against chromatic aberrations; and (b) may enable more light to reach the lens for each frequency, because (in the uniaxial design), the aperture is not divided for side-by-side spectral filters.

FIG. 18A shows three notch filters and three optical cavities. However, the number of notch filters and number of optical cavities (e.g., in a uniaxial configuration for multi-spectral imaging) may vary, depending on the particular implementation. For example, in a uniaxial configuration for multi-spectral imaging: (a) the number of notch filters may be equal to the number of optical cavities; and (b) the number of optical cavities may be two, three, four, five, six, seven, eight, nine, ten, or more than ten and less than twenty, or more than or equal to twenty.

In some cases, time-encoded spectrums from the different spectral filters enable the ToF camera to perform single-acquisition multi-spectral imaging at ultrafast rates. For example, in some cases (including implementations shown in FIGS. 18 and 8, time-encoded spectrums may enable the ToF to perform multi-spectral imaging at the nominal temporal resolution of the ToF camera, with no loss of spatial resolution and with no loss of temporal resolution. This is much better than conventional methods of spectral filtering, which: (a) use either electronic illumination sweeping or dividing the sensor's spatial resolution for different wavelengths; and (b) thus may limit speed (of image acquisition) and resolution of the acquired image.

Ultrafast multi-spectral imaging has many practical applications. Among other things, it may be used for fluorescent imaging of biological samples as well as imaging of non-reversible phenomena such as ablation, ionization, and filamentation.

Figure 8:
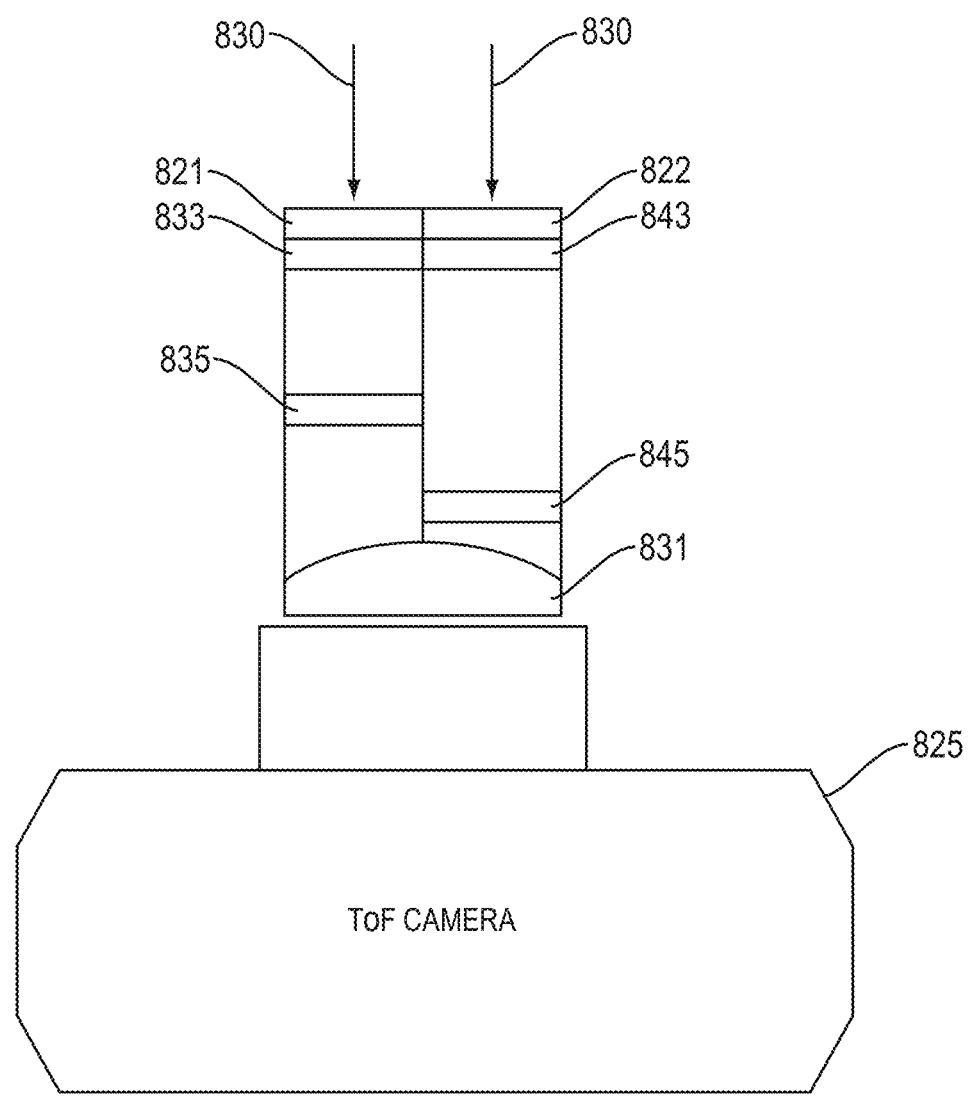
FIG. 8 shows a top view of a multi-spectral ToF imaging system.

Alternatively, in some implementation of this invention, a multi-spectral ToF imaging system may be positioned side-by-side (as shown in FIG. 8), instead of in a uniaxial configuration.

FIG. 8 shows a top view of a multi-spectral ToF imaging system, in an illustrative implementation of this invention. In FIG. 8, a set of optical cavities enables ultrafast, multi-spectral imaging by time-encoding different spectral signals.

In FIG. 8, multi-spectral light 830 passes through a first spectral filter 821 and a second spectral filter 822. These spectral filters 821, 822 are located side-by-side. Thus, light from both spectral filters reaches lens 831, but light that passes through the first spectral filter does not pass the second spectral filter, and light that passes through the second spectral filter does not pass through the first spectral filter. The first spectral filter 821 allows a first spectrum of light to pass (e.g. a narrow band of wavelengths). The second spectral filter 822 allows a second spectrum of light to pass (e.g., a different, narrow band of wavelengths).

In FIG. 8, a first optical cavity is located in an optical path between the first spectral filter 821 and the lens 831. Specifically, the first optical cavity is behind the first spectral filter 821 and in front of lens 831. The first optical cavity comprises STM 833 and STM 835.

In FIG. 8, a second optical cavity is located in an optical path between the second spectral filter 822 and the lens 831. Specifically, the second optical cavity is behind the second spectral filter 822 and in front of lens 831. The second optical cavity comprises STM 843 and STM 845.

In FIG. 8, the first optical cavity has a different roundtrip distance (distance that light travels during a roundtrip in the cavity) than the second optical cavity does. For example, if an impulse of light from the scene enters the first and second optical cavities, then: (a) exit pulses from the first optical cavity occur at different times than exit pulses from the second optical cavity; and (f) thus, the first and second spectrums of light (from the first and second spectral filters, respectively) arrive at the ToF camera at different times.

In FIG. 8, the first and second optical cavities, respectively, delay the first and second spectrums by different amounts of time due to the different roundtrip distances in the cavities. Thus, in FIG. 8, a set of optical cavities time-encodes different spectrums from different spectral filters.

Alternatively, in FIG. 8, each of the spectral filters 821, 822 may be located behind (instead of in front of) its respective optical cavity. For example, in some alternative implementations, filter 821 may be located behind the optical cavity comprising STMs 833 and 835, and filter 822 may be located behind (instead of in front of) the optical cavity comprising STMs 843 and 845.

Alternatively, in FIG. 8, each of the spectral filters may be located inside (instead of in front of or behind) an optical cavity. For example, in some alternative implementations, filter 821 may be located inside the optical cavity comprising STMs 833 and 835, and filter 822 may be located inside the optical cavity comprising STMs 843 and 845. Placing a spectral filter inside an optical cavity—such that light reflecting repeatedly inside the cavity passes through spectral filter repeatedly—may tend to sharpen the spectral window of the filter in an exponential manner, because the light signal passing through the filter may be multiplied by the filter each time that light passes through the filter. Sharpening the filter window may be desirable, for example, in spectrum un-mixing of biological samples stained with fluorophores with neighboring spectra.

In illustrative implementations of this invention, light exiting the optical cavity becomes fainter as the number of roundtrips increases. That is, the intensity of light exiting the cavity tends to decrease as the number of roundtrips (before the light exits the cavity) increases.

Figure 9:
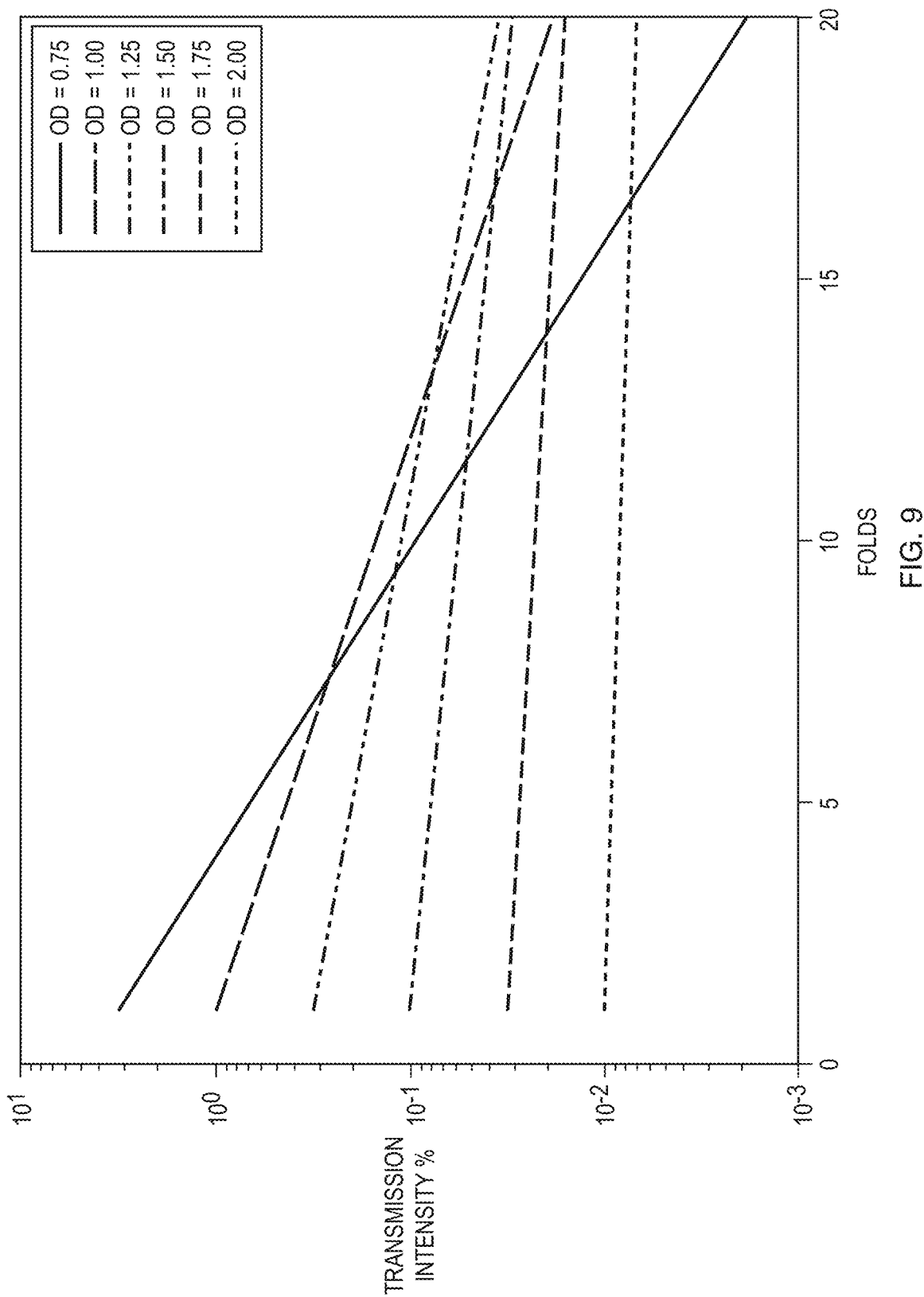
FIG. 9 is a chart of transmission intensity as a function of number of optical cavity round trips, for different optical densities of ND filters.

FIG. 9 is a chart of transmission intensity as a function of number of optical cavity round trips, in a prototype of this invention. In FIG. 9, the vertical axis is transmission intensity (that is, the intensity of light exiting the optical cavity) and the horizontal axis is the number of folds. For purposes of FIG. 9: (a) there are two folds per roundtrip of light in the cavity and (b) the cavity is a Fabry-Perot optical cavity that comprises two ND filters. The optical density shown in the key in FIG. 9 is the optical density of each ND filter, respectively, in this Fabry-Perot cavity.

FIG. 9 illustrates that, for an optical cavity with relatively low optical density ND filters (e.g., optical density equal to 0.75): (a) the initial drop-off in intensity is relatively small, but (b) the intensity then drops off very rapidly thereafter. FIG. 9 illustrates that, for an optical cavity with relatively high optical density ND filters (e.g., optical density equal to 2.0): (a) the initial drop-off in intensity is relatively large, but (b) the intensity then drops off very slowly thereafter. For example, an ND filter with an optical density of 2.0 transmits 1% of incident light and reflects 99% of incident light. Thus, for a ND filter with an optical density of 2.0: (a) there is a large drop-off of intensity initially, because only 1% of the light is transmitted through the ND filter at the end of the first pass of light inside the cavity, and (b) the drop-off of intensity is very slow thereafter, because only 1% of the then remaining light leaks from the cavity in each reflection from an ND filter thereafter.

In many implementations, the drop-off in intensity as roundtrips increase creates a design tradeoff. For example, if the goal is to decrease lens/sensor distance by folding light inside an optical cavity using a "lens before optical cavity" configuration, then increasing the number of roundtrips: (a) tends to decrease the lens/sensor distance (which is desirable) but (b) tends to reduce the intensity of light (which is often not desirable).

The drop-off of intensity (as number of roundtrips increase) tends not to be a problem in some implementations, where ultrafast ToF cameras that operate in a photon-starved mode (e.g., SPAD cameras) are employed.

Furthermore, the drop-off of intensity (as the number of roundtrips increase) tends to be mitigated in some implementations, in which images may be acquired with only one or a few roundtrips. For example, in some implementations, a multi-spectral ToF may capture time-encoded spectral data after only one or two roundtrips. Also, in some cases, a multi-zoom camera that focuses at x number of scene depths may capture images with only x−1 roundtrips (e.g., by capturing an image of first pass light, an image of first roundtrip light, and so on, until x images, each focused at a different scene depth, are captured). For example, in some cases, a multi-zoom camera that focuses at two scene depths may capture images with only one roundtrip in the cavity.

Figure 10:
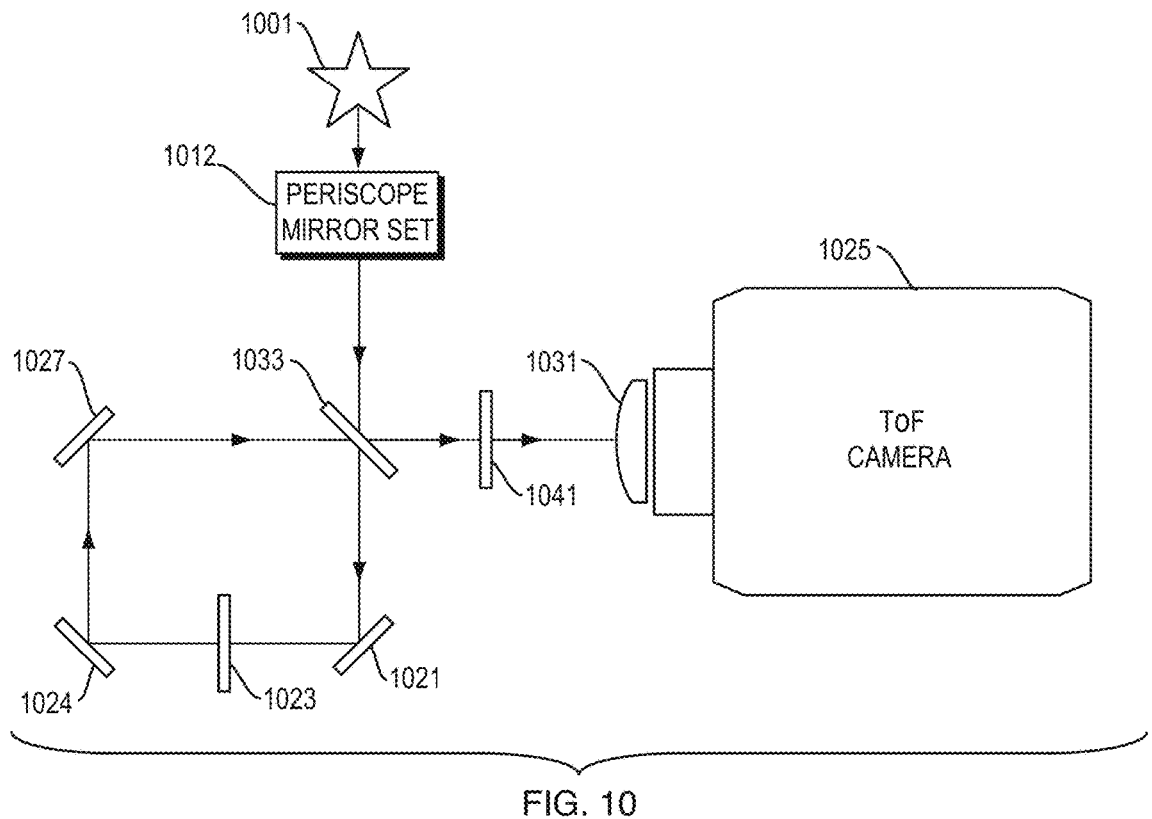
FIG. 10 shows a ToF imaging system that takes ellipsometry measurements.

FIG. 10 shows a ToF imaging system that takes ellipsometry measurements, in an illustrative implementation of this invention. In FIG. 10, a ring optical cavity enables ultrafast ellipsometry measurements.

In the example shown in FIG. 10, a ring optical cavity is located in an optical path between a scene and a ToF camera. Light from a scene 1001 passes through a periscope mirror set 1012 and strikes STM 1033. Then a portion of this light reflects from STM 1033 (without ever entering the ring optical cavity) and travels to a linear polarizer (LP) 1041. Another portion of this light enters the ring optical cavity by passing through STM 1033, and then starts a roundtrip inside the cavity. During each roundtrip of light in the ring optical cavity, light travels from STM 1033, to mirror 1021, then through half-wave plate (HWP) 1023, then to mirror 1024, then to mirror 1027 and then back to STM 1033. At the end of each roundtrip: (a) a portion of the light that strikes STM 1033 passes through STM 1033 and travels to the linear polarizer 1041, and (b) a portion of the light that strikes STM 1033 reflects from STM 1033 and starts another roundtrip in the cavity. Thus, after light enters the ring optical cavity, it reflects in repeated roundtrips in the cavity, with part of the light leaking through STM 1033 at the end of each roundtrip.

In FIG. 10, after light reflects from STM 1033 (without entering the cavity) or exits the cavity (by passing through STM 1033), the light travels to linear polarizer 1041, then to lens 1031, then to ToF camera 1025.

In FIG. 10, the half-wave plate (HWP) 1023 rotates the polarization of light, each time that light passes through the half-wave plate (e.g., during each roundtrip of light inside the optical cavity). Because the polarization of light is rotated by a small angle in each roundtrip, the polarization of light exiting the STM (and striking the linear polarizer) is different for different roundtrips. Thus, after each roundtrip in the cavity, the fixed linear polarizer filters a different portion of the polarization spectrum of the initial light that entered the cavity (where each portion of the polarization spectrum comprises a different polarization angle or different range of polarization angles). In some implementations, this configuration (half-wave plate inside ring cavity) enables the ToF camera to take ellipsometry measurements.

In the example shown in FIG. 10, each time that the light passes through HWP 1023, the HWP 1023 rotates the polarization angles of the light by angle a. In FIG. 10, linear polarizer (LP) 1041 allows only light with polarization angle to pass through the LP. But the polarization of light is being rotated by angle a each time that the light passes through the HWP.

Thus, in FIG. 10, in the case of light that never enters the ring cavity (but instead reflects off STM 1033 directly to the LP, and thus never goes through the HWP and is never rotated by the HWP), the LP allows to pass (through the LP) only light that initially (i.e., when leaving the scene) had a polarization angle of β. In FIG. 10, in the case of light that completes only one roundtrip in the ring cavity (and thus travels through the HWP once and is rotated by angle α), the LP allows to pass (through the LP) only light that initially (i.e., when leaving the scene) had a polarization angle of β−α. In FIG. 10, in the case of light that completes only two roundtrips in the ring cavity (and thus travels through the HWP twice and is rotated by a cumulative angle of 2α), the LP allows to pass (through the LP) only light that initially (i.e., when leaving the scene) had a polarization angle of β−2α.

Thus, in FIG. 10, the ToF camera 1025 may capture multiple images, where each image is of light with a different initial polarization angle (or different range of polarization angles). For example, the ToF camera may capture images of light that has completed zero, one or more roundtrips of light in the ring cavity, and thus has different initial polarization angles (or ranges of polarization angles), depending on the number of roundtrips completed.

By capturing data regarding light with different polarization angles, the ToF camera 1025 may take ellipsometric measurements in a single acquisition. Advantageously, in some cases, these ellipsometric measurements may be ultra-fast and wide-field (and thus not taken by a point-by-point raster scan). In some implementations of this invention, the polarization evolution of ultrafast phenomena may be captured with the nominal time-resolution of the ToF camera 1025.

In FIG. 10, if the ToF camera 1025 is a streak camera that measures spatial information in only an x dimension, then the periscope mirrors 1012 may be employed to scan the scene in they dimension. In other cases, the periscope mirrors 1012 may be omitted, and light from the scene 1001 may travel directly to STM 1033.

Figure 11:
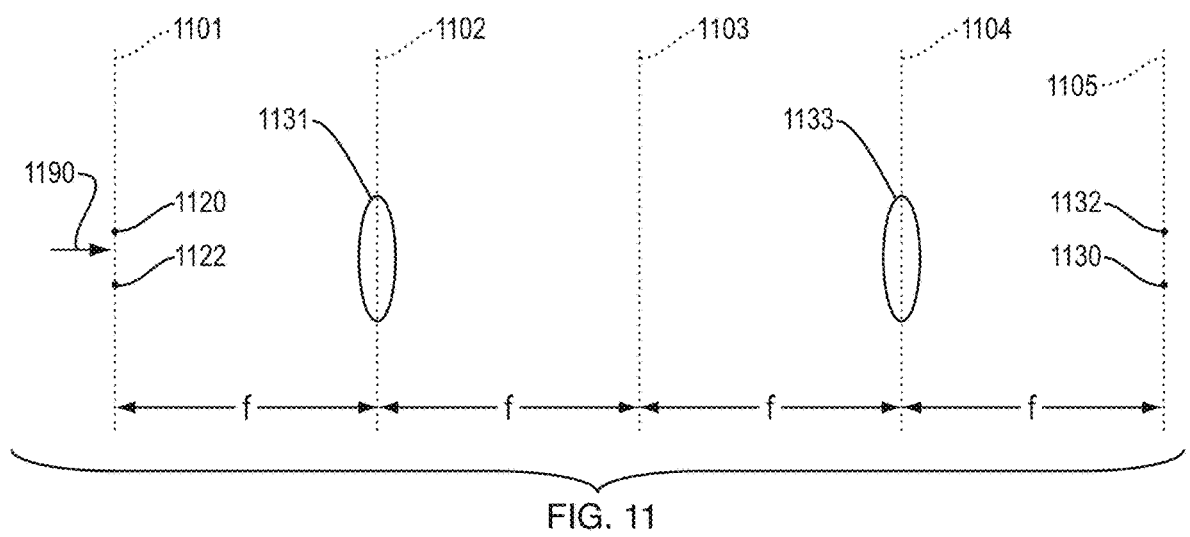
FIG. 11 is a diagram that shows an example of a Fourier region and a fractional Fourier region of an optical system.

FIG. 11 is a diagram that shows an example of a Fourier region and a fractional Fourier region of an optical system.

The optical configuration in FIG. 11 is commonly referred to as a "4 f" configuration. In FIG. 11, a transmissive scene (e.g., a backlit mask or backlit transparency) is located at plane 1101. The transmissive scene includes points 1120 and 1122. A spherical lens 1131 is located at plane 1102. Another spherical lens 1133 is located at plane 1104. Both of these lenses have a focal length f The total distance from plane 1101 to plane 1105 is 4 f that is, plane 1101 is distance f from plane 1102, which is distance f from plane 1103, which is distance f from plane 1104, which is distance f from plane 1105.

In the example shown in FIG. 11, a transmissive scene is backlit by collimated light 1190 (i.e., by a plane wavefront of light). The transmissive scene includes points 1120, 1122 and is located at plane 1101. Light that exits the transmissive scene travels through lens 1131, then through lens 1133, and then to plane 1105. An output image forms at plane 1105. As the light travels from plane 1101 to plane 1105, the first lens 1131 performs a Fourier transform (in the spatial frequency domain) and the second lens 1133 performs an inverse Fourier transform that produces, at the output plane 1105, an inverted replica of the input image.

In the example shown in FIG. 11, let f(x,y) denote the intensity of light in the 2D input scene at plane 1101. Then, under certain conditions: (a) the light signal at the Fourier plane (which is plane 1103) is the Fourier transform (in the spatial frequency domain) of f(x,y); and (b) the image that forms at the output plane (plane 1105) is −f(x,y); that is, the inverse of the input image. For example, in this inverse image in the output plane, points 1132 and 1130 may correspond to points 1122 and 1120, respectively, of the input image. Each point in the Fourier plane 1103 may correspond to a single spatial frequency.

In FIG. 11, the input light signal occurs at plane 1101.

In FIG. 11, the light signal in the region between planes 1102 and 1103 may be modeled as a fractional Fourier transform of the input light signal. Likewise, the light signal in the region between planes 1103 and 1104 may be modeled as a fractional Fourier transform of the input light signal. Thus, these two regions (between planes 1102 and 1103, and between planes 1103 and 1104, respectively) are examples of fractional Fourier regions.

FIG. 11 is included solely to give the reader an introduction to the concepts of a Fourier plane and a fractional Fourier region. In most implementations of this invention: (a) a "4 f" configuration is not used; and (b) thus, the configuration shown in FIG. 11 is not used.

However, in many implementations of this invention, a Fourier plane exists one focal length from a spherical lens and a fractional Fourier region exists, albeit in a different optical configuration than that shown in FIG. 11.

For example, in some implementations of this invention: (a) a "lens before optical cavity" is employed; and (b) the optical cavity is located in a fractional Fourier region.

Figure 12:
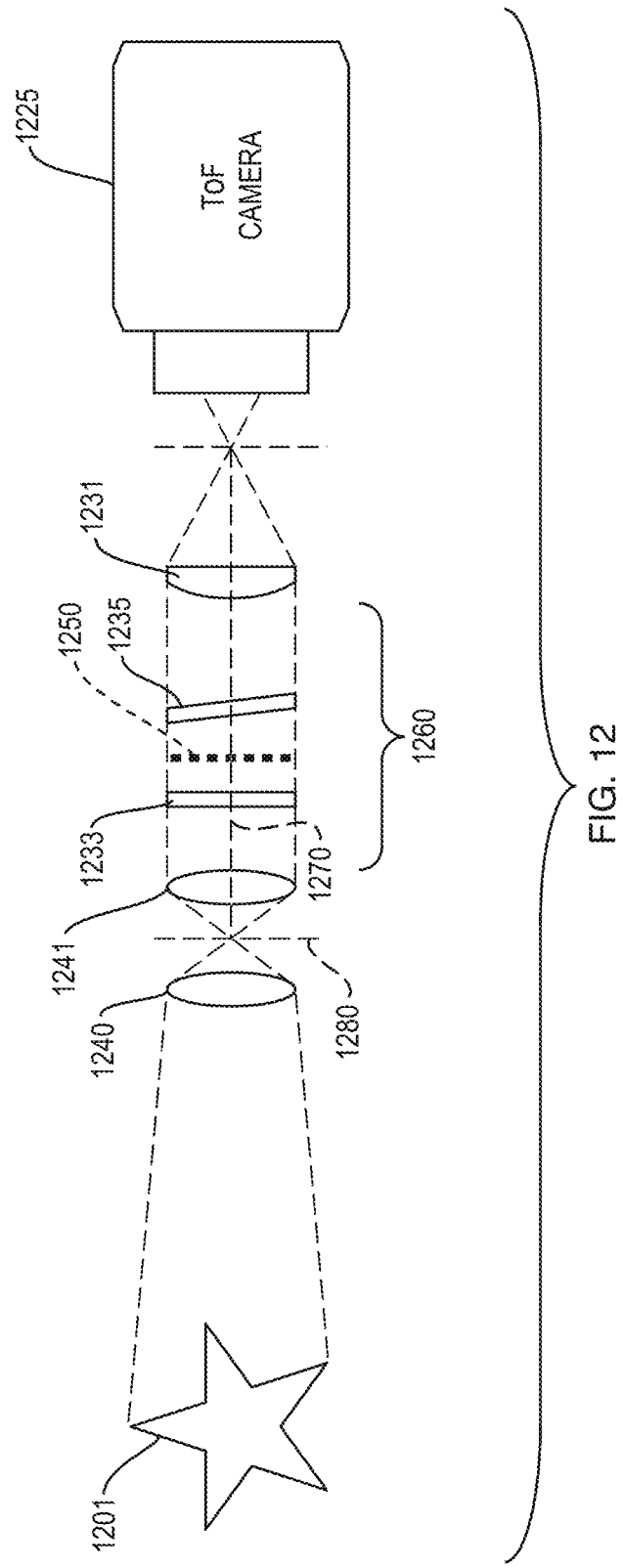
FIG. 12 shows a ToF imaging system that performs ultrafast filtering of spatial frequencies.

FIG. 12 shows a ToF imaging system that performs ultrafast filtering of spatial frequencies, in an illustrative implementation of this invention. In FIG. 12, a collimating lens outputs collimated light that, while collimated (i) passes through the Fourier plane and (ii) is incident on an optical cavity. This incident light then enters the optical cavity.

In the example shown in FIG. 12, light from a scene 1201 may pass through entrance lens 1240, then through collimating lens 1241, then through an optical cavity, then through imaging lens 1231, and then to a ToF camera 1225. The optical cavity may be a Fabry-Perot cavity that comprises STM 1233 and STM 1235. A mask 1250 may be located inside the optical cavity.

In FIG. 12, entrance lens 1240 may converge the incoming wavefront. Plane 1280 may be a Fourier plane of the wavefront that exits lens 1240. This Fourier plane 1280 may be located at a distance from collimating lens 1241 which is equal to the focal length of collimating lens 1241. Thus, light exiting lens 1241 may be collimated and may, while still collimated, pass through a Fourier plane and then be incident of the optical cavity (which itself comprises STMs 1233 and 1235). For example, the collimated light may, while still collimated, be incident on the front STM 1233 of the optical cavity. This incident light may then enter the optical cavity. One of the surfaces of the optical cavity (e.g., STM 1235) may be tilted relative to what would, in the absence of the optical cavity, be an optical axis of the system (e.g., axis 1270). This tilt may cause the optical cavity to be unstable. (In FIG. 12, the tilt is exaggerated for clarity of illustration).

As light reflects repeatedly inside the unstable cavity: (a) light may tend to "walk off" (e.g., tend to move further away from axis 1270); and (b) thus different regions of the light signal may be filtered (blocked) by mask 1250 in different roundtrips of light inside the cavity. In FIG. 12, because each point in a Fourier plane corresponds to a different spatial frequency, different spatial frequencies of light may be filtered (blocked) by mask 1250 in different roundtrips of light in the optical cavity. At the end of the first pass of light in the cavity and at the end of each roundtrip of light in the cavity, respectively, light inside the cavity may strike rear STM 1235. A portion of this light may reflect from STM 1235 back into the FP cavity; and a portion may pass through rear STM 1235. Light that exits the FP cavity through rear STM 1235 may then travel through imaging lens 1231 to ToF camera 1225. Lens 1231 may convert the filtered Fourier signal that exits the optical cavity into a 2D spatial signal at the image plane (which is the sensor plane of the ToF camera).

Thus, in FIG. 12, different spatial frequencies may be filtered, depending on how many roundtrips in the optical cavity occur before light exits the cavity.

In some implementations: (a) an unstable optical cavity is located in a "Fourier volume" (e.g., 1260); and (b) a ToF camera performs ultrafast filtering of spatial frequencies in a light signal. This ultrafast filtering has many practical applications, including enhanced object detection in imaging of ultrafast phenomena, such as ultrafast fluid streams or ultrafast fluid turbulences.

Figure 13:
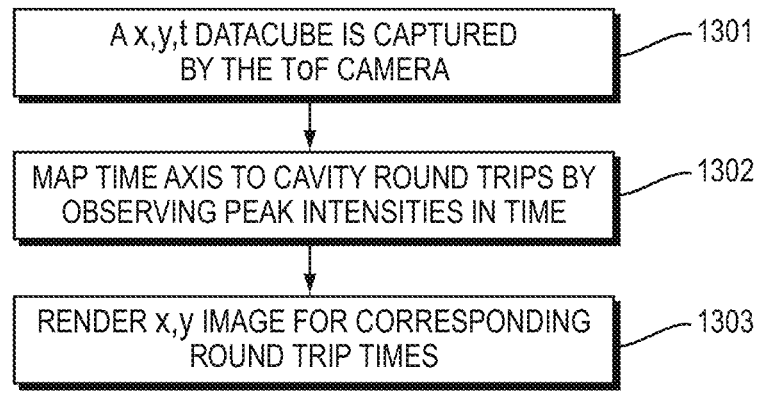
FIG. 13 is a flowchart of an image processing method.

FIG. 13 is a flowchart of an image processing method, in an illustrative implementation of this invention. The method shown in FIG. 13 includes the following steps: An x-y-t data cube is captured by a ToF camera (Step 1301). Map time axis to cavity round trips by observing peak intensities in time (Step 1302). Render x-y image for corresponding round trip times (Step 1303).

Figure 14:
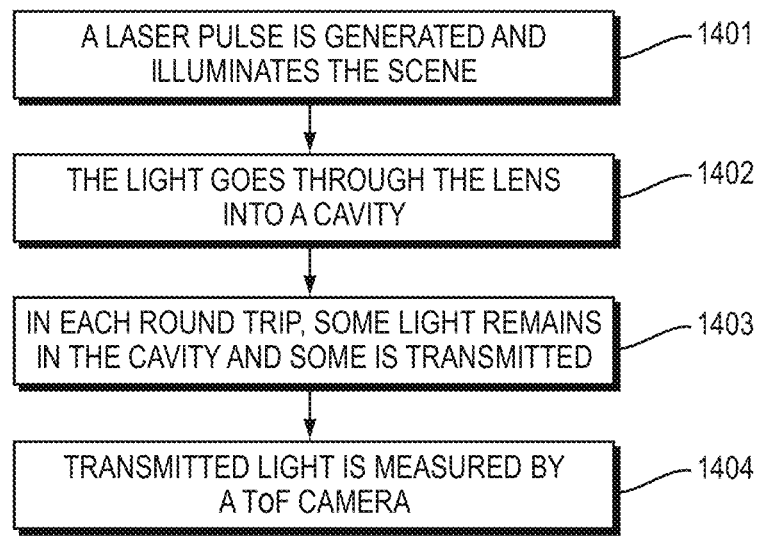
FIG. 14 is a flowchart of a method, in which light passes through a "lens before optical cavity" configuration of optical elements.

FIG. 14 is a flowchart of a method in which light passes through a "lens before optical cavity" configuration of optical elements, in an illustrative implementation of this invention. The method shown in FIG. 14 includes the following steps: A laser pulse is generated and illuminates the scene (Step 1401). The light goes through a lens into a cavity (Step 1402). In each roundtrip, some light remains in the cavity and some is transmitted (Step 1403). Transmitted light is measured by a ToF camera (Step 1404).

Figure 15:
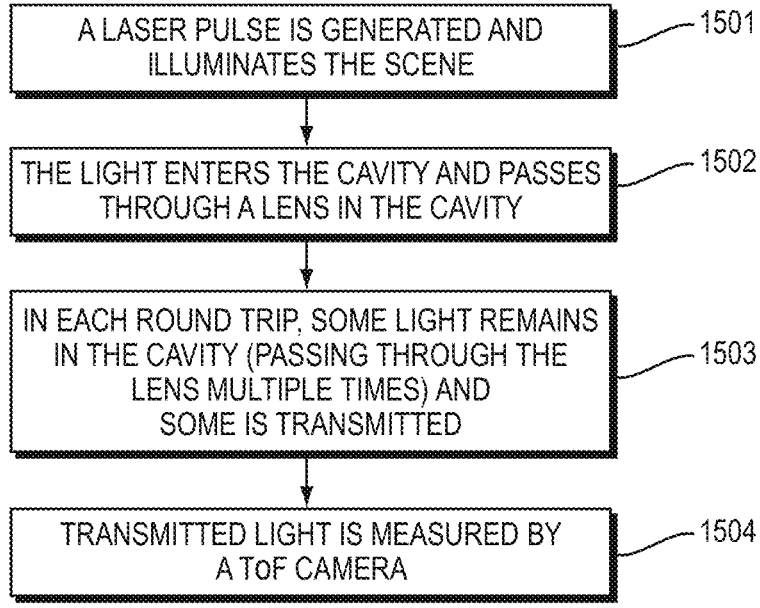
FIG. 15 is a flowchart of a method, in which light passes through a "lens inside optical cavity" configuration of optical elements.

FIG. 15 is a flowchart of a method in which light passes through a "lens inside optical cavity" configuration of optical elements, in an illustrative implementation of this invention. The method shown in FIG. 15 includes the following steps: A laser pulse is generated and illuminates the scene (Step 1501). The light enters a cavity and passes through a lens in the cavity (Step 1502). In each roundtrip, some light remains in the cavity (passing through the lens multiple times) and some is transmitted (Step 1503). Transmitted light is measured by a ToF camera (Step 1504).

Figure 16:
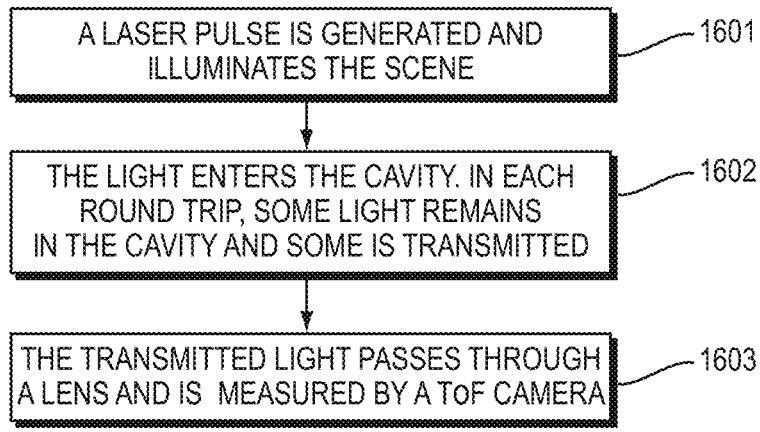
FIG. 16 is a flowchart of a method, in which light passes through a "lens after optical cavity" configuration of optical elements.

FIG. 16 is a flowchart of a method in which light passes through a "lens after optical cavity" configuration of optical elements, in an illustrative implementation of this invention. The method shown in FIG. 16 includes the following steps: A laser pulse is generated and illuminates the scene (Step 1601). The light enters the cavity. In each roundtrip, some light remains in the cavity and some is transmitted (Step 1602). The transmitted light passes through a lens and is measured by a ToF camera (Step 1603).

Figure 17:
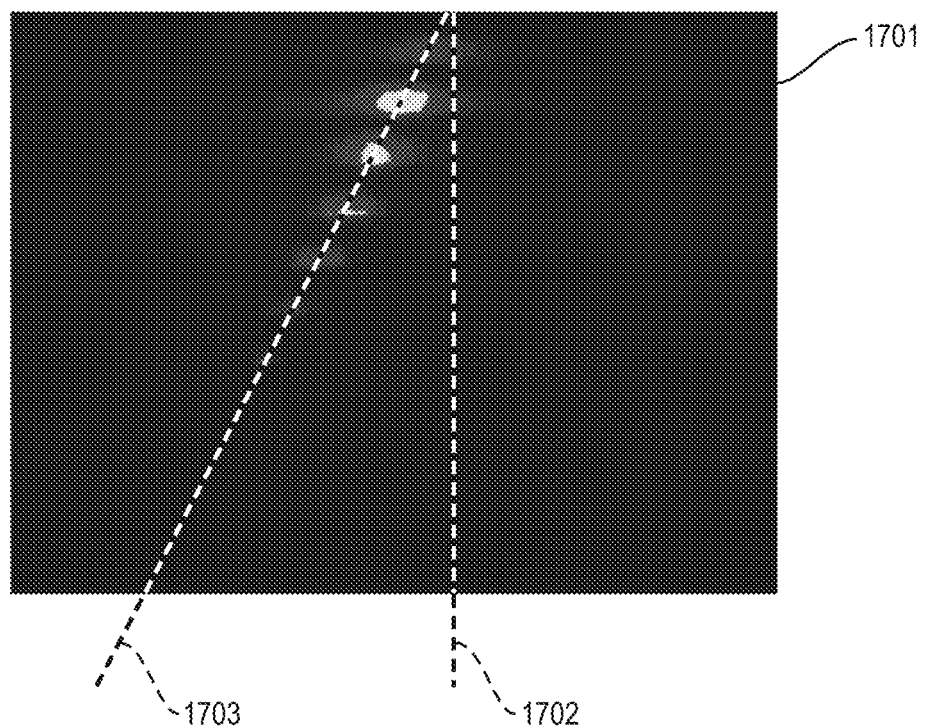
FIG. 17 shows an example in which spatial divergence of light increases as the number of cavity roundtrips increases.

FIG. 17 shows an example in which spatial divergence of light increases as the number of cavity roundtrips increases, in an illustrative implementation of this invention. In some implementations, this increasing spatial divergence makes it easier to detect small angular differences in the orientation of light incident on a ToF camera.

FIG. 17 is an x-t streak image 1701, in which streaks are formed by non-paraxial light from an object in the scene. In FIG. 17: (a) the vertical axis in FIG. 17 is the t (time) dimension, with time increasing from top to bottom of the streak image; (b) line 1702 corresponds to an optical axis of the imaging system; (c) non-paraxial light entered an optical cavity and reflected repeatedly in the cavity; (d) as this non-paraxial light exited the cavity (at the end of the first pass in the cavity and thereafter at the end of successive roundtrips in the cavity), this non-paraxial light formed a series of streaks in the streak image; and (e) line 1703 intersects this series of streaks. In FIG. 17, the spatial distance between line 1703 (which intersects the streaks formed by the non-paraxial light) and line 1702 (which corresponds to the optical axis) increases over time (the more time passes, the greater the spatial divergence).

In some implementations, this increasing spatial divergence makes it easier to detect small angular deviations of light from an optical axis. For example, in some use cases: (a) small angular deviations (relative to an optical axis) of incident light at a ToF camera may be caused by tiny irregularities in a surface; and (b) the increasing spatial divergence in the captured images may make it easier to detect these surface irregularities.

As noted above, in many implementations: (a) a light source (e.g., 101, 401) emits pulsed light that illuminates the scene; (b) pulses of light from a scene enter the optical cavity; (c) light reflects repeatedly inside the optical cavity, with a portion of the light exiting at the end of the first pass of light in the cavity and thereafter at the end of successive roundtrips of light; and (e) the light exiting the optical cavity forms a series of pulses of light ("exit pulses").

However, this invention is not limited to pulsed light. In some implementations, the light source (e.g. 101, 401) emits light that is not pulsed, and light (from the scene) which is not pulsed enters the optical cavity.

In some implementations of this invention, the ToF camera (e.g., 125, 425, 725, 825, 1025, 1225, or 1825) comprises a streak camera that captures data regarding time-of-arrival (or time-of-flight) of incident light. For example, the time-of-arrival (or time-of-flight) of incident light may be indicated by the t (time) dimension of an x-t image captured by a streak camera.

However, this invention is not limited to a streak camera.

In illustrative implementations of this invention, any type of ToF camera may be employed to measure: (a) time-of-flight of incident light; (b) time-of-arrival of incident light; (c) depth; or (d) scene-roundtrip-distance. As used herein, "scene-roundtrip-distance" means a distance that light travels from the camera to the scene and back to the camera. Scene-roundtrip-distance may be twice the depth. These factors (time-of-flight, time-of-arrival, depth, and scene-roundtrip-distance) may encode closely related information, because the distance that light travels along a given path depends (at least in part) on how long it takes for the light to travel the path.

How many roundtrips of light occur in an optical cavity, before light (from the scene) exits the cavity and travels to the ToF camera, affects all four of these factors (time-of-flight, time-of-arrival, depth, and scene-roundtrip-distance).

In illustrative implementations, any one or more of these four factors (time-of-flight, time-of-arrival, depth, and scene-roundtrip-distance) may be used to selectively acquire data regarding light (from the scene) that exited the cavity after a certain number of roundtrips in the cavity.

For example, in some implementations: (a) a "lens before cavity" configuration is employed; (b) light from the scene enters an optical cavity; (c) the cavity folds an optical path, thereby allowing reduction of the Euclidean physical distance between a lens and ToF camera sensor; (c) the ToF camera sensor is located at a geometric plane at which light—which has exited the cavity after a given number of roundtrips in the cavity—is focused; and (d) the ToF camera may employ any one or more of these four factors (time-of-flight, time-of-arrival, depth, and scene-roundtrip-distance) to selectively acquire data regarding light that exited the cavity after the given number of roundtrips in the cavity.

Likewise, in some implementations: (a) a "lens inside cavity" configuration is employed; (b) light from the scene enters an optical cavity; (c) a lens is located inside the cavity, such that light passes through the lens repeatedly as light reflects in roundtrips inside the cavity; (d) the divergence or convergence of the light wavefront inside the cavity changes each time that light passes through the lens, and thus the portion of the wavefront that exits the cavity at the end of each roundtrip in the cavity, respectively, is focused at a different scene depth (e.g., such that the scene depth at which the system is focused changes after each roundtrip of light in the cavity); (e) the ToF camera may employ any one or more of these four factors (time-of-flight, time-of-arrival, depth, and scene-roundtrip-distance) to selectively acquire a first set of data regarding light that exited the cavity after a first number of roundtrips in the cavity and to selectively acquire a second set of data regarding light that exited the cavity after a second number of roundtrips in the cavity; (f) the ToF camera generates, based on the first set of data, a focused image at a first scene depth; and (g) the ToF camera generates, based on the second set of data, a focused image at a second scene depth. For example, the second scene depth may be more than twice the first scene depth.

Likewise, in some implementations: (a) a "lens behind cavity" configuration is employed for ultrafast multispectral imaging; (b) the imaging system includes multiple optical cavities; (c) light from the scene passes through the cavities; (d) each respective cavity is a different size and has a different roundtrip distance for light reflecting in a complete roundtrip inside the respective cavity; (e) different colors (frequency bands) of light exit the set of optical cavities at different times; and (f) the ToF camera may employ any one or more of these four factors (time-of-flight, time-of-arrival, depth, and scene-roundtrip-distance) to selectively acquire a first set of data regarding a first color of light that exits the set of optical cavities at a first time and to selectively acquire a second set of data regarding a second color of light that exits the set of optical cavities at a second time.

Likewise, in some implementations: (a) ultrafast ellipsometry measurements are taken with an imaging system that includes a lens, a ToF camera, an optical cavity, a linear polarizer that is behind the cavity, and a half-wave plate that is inside the cavity; (b) light from the scene enters the optical cavity; (c) different portions of light (corresponding to different polarizations of the initial light from the scene) reach the ToF camera at different times; and (d) the ToF camera may employ any one or more of these four factors (time-of-flight, time-of-arrival, depth, and scene-roundtrip-distance) to selectively acquire a first set of data regarding a first portion of light (corresponding to a first polarization of the initial light from the scene) and to selectively acquire a second set of data regarding a second portion of light (corresponding to a second polarization of the initial light from the scene).

Likewise, in some implementations: (a) an imaging system performs ultrafast filtering of spatial frequencies of light; (b) light from the scene passes through a collimating lens; (c) the collimating lens outputs collimated light that, while still collimated, passes through a Fourier plane and is incident on an unstable optical cavity; (d) different portions of light (each with a different spectrum of spatial frequencies) reach a ToF camera at different times; and (e) the ToF camera may employ any one or more of these four factors (time-of-flight, time-of-arrival, depth, and scene-roundtrip-distance) to selectively acquire a first set of data regarding light that has a first spectrum of spatial frequencies and to selectively acquire a second set of data regarding light that has a second spectrum of spatial frequencies.

As noted above, in illustrative implementations, any type of ToF camera may be employed to measure, for each respective pixel of the camera: (a) one or more of these four factors (time-of-flight of incident light, time-of-arrival of incident light, scene depth, and scene-roundtrip-distance); and (b) amplitude of incident light.

In illustrative implementations of this invention, time or depth information (e.g., time-of-flight, time-of-arrival, depth, or scene-roundtrip-distance) may be obtained through direct or indirect measurement of time of arrival of the light or phase or frequency of the received electromagnetic wave.

For example, in some implementations of this invention, the ToF camera (e.g., 125, 425, 725, 825, 1025, 1225, or 1825) comprises a SPAD sensor (single photon avalanche diode arrays). The SPAD sensor may be operated in TCSPC (Time correlated single photon counting mode). For example, in some implementations: (a) the SPAD sensor extracts information regarding time-of-flight of incident light that has exited an optical cavity; and (b) a different number of roundtrips of light in an optical cavity before light exits the cavity results in a different time-of-flight. For example, when using a SPAD sensor, the measured time-of-flight (or measured time-of-arrival) may be different for light that exits an optical cavity after one roundtrip in the cavity than for light that exits the cavity after two roundtrips in the cavity. Optionally, a time-of-flight (or time-of-arrival) measured by the SPAD may be mapped to depth or to scene-roundtrip distance.

Or, for example, in some implementations of this invention, the ToF camera (e.g., 125, 425, 725, 825, 1025, 1225, or 1825) comprises a continuous wave time-of-flight (CW ToF) sensor. For example, the CW ToF sensor may comprise a Swiss Ranger 4000 by MESA Imaging, or a Photonic Mixer Device sensor by PMD Technologies, or a Kinect® sensor for Xbox One® by Microsoft®. In some implementations of this invention: (a) the ToF camera comprises a CW ToF sensor; (b) the scene is illuminated with amplitude modulated light that is not pulsed (e.g., amplitude modulated continuous wave laser light that is not pulsed); (c) the CW ToF sensor calculates correlation of incident light with an internal electronic reference signal to extract the phase of the returned amplitude-modulated light and then maps the phase to a depth (or scene-roundtrip-distance, time-of-flight, or time-of-arrival); and (d) each round trip of light that occurs in an optical cavity before light exits the cavity results in a different phase that is detected by the CW ToF sensor and is mapped to a different depth (or to a different scene-roundtrip-distance, time-of-flight, or time-of-arrival). For example, the detected phase may be different for light that exits an optical cavity after one roundtrip in the cavity than for light that exits the cavity after two roundtrips in the cavity.

Or, for example, in some implementations of this invention, the ToF camera (e.g., 125, 425, 725, 825, 1025, 1225, or 1825) comprises a so-called frequency domain CW ToF. For example:(a) the ToF camera may comprise frequency domain CW ToF sensor; (b) the scene may be illuminated with frequency chirped CW laser light (e.g. with a chirp that has MHz bandwidth); (c) a short-time fourier transform (STFT) of the reflected signal may be used to calculate a spectrogram of the reflected signal; (d) by comparison to reference chirped signal, depth information or time-of-flight information may be extracted; and (e) each round trip of light that occurs in an optical cavity before light exits the cavity may result in a different frequency that is detected by the CW ToF sensor and is mapped to a different depth (or to a different scene-roundtrip-distance, or to a different time-of-flight, or to a different time-of-arrival). For example, the detected frequency may be different for light that exits an optical cavity after one roundtrip in the cavity than for light that exits the cavity after two roundtrips in the cavity.

In illustrative implementations, it is desirable that the ToF camera is configured to resolve light that exits an optical cavity at the end of different round trips of light inside the cavity (e.g., is configured to distinguish between light that exits the cavity after x roundtrips in the cavity from light that exits the cavity after x+1 roundtrips in the cavity, were x is an integer that is greater than or equal to zero).

In some implementations of this invention: (a) the ToF camera comprises a streak camera that captures only 1D spatial information in a single acquisition; and (b) a periscope mirror set is employed to scan the scene vertically. In some other implementations: (a) the ToF camera comprises a 2D ToF camera (e.g. SPAD camera, CW phase ToF camera, or CW frequency ToF camera); and (b) a periscope mirror set is not employed.

In some implementations, folding of an optical path inside an optical cavity may result in a measured depth (or measured scene-roundtrip-distance) that is greater than would occur in the absence of the folding. Likewise, in some implementations, folding of an optical path inside an optical cavity may result in: (a) a measured time-of-flight that is greater than would occur in the absence of the folding; or (b) a measured time-of-arrival that is later than would occur in the absence of the folding.

In some implementations of this invention, selective acquisition of data may occur as follows: (a) a ToF camera may acquire a large set of data which represents light measurements taken by a photodetector or light sensor of the ToF camera and which is associated with many different depths (or scene-roundtrip-distances, or times-of-flight, or times-of-arrival) and thus is associated with many different portions of light, each of which exited an optical cavity after a different number of roundtrips of light in the cavity; (b) a subset of data, out of this large set of data, may be associated with a particular range of times-of-flight (or times-of-arrival, or depths, or scene-roundtrip-distances) and thus may be associated with light that exited the cavity after a particular number of roundtrips; (c) this subset of data may be selected out of the larger set of data that the ToF camera captured; and (d) an image may be generated, based on this subset of data and not on any other data. Or, for example, the selective acquisition may occur as follows: (a) a ToF camera may acquire a set of data which represents light measurements taken by a photodetector or light sensor of the ToF camera and which is associated with only a particular range of times-of-flight (or times-of-arrival, or depths, or scene-roundtrip-distances); and (b) an image may be generated, based on this set of data and not on any other data.

In many implementations of this invention, the optical elements of a ToF optical system are in a fixed spatial configuration—and have a fixed shape—throughout normal operation of the system.

Alternatively, in some implementations: (a) the relative spatial position or shape of one or more optical elements in the imaging system may be adjusted during normal operation of the system (e.g., after capturing a first set of images and before capturing a second set of images); and (b) these adjustments may include changing the cavity size of an optical cavity (e.g., by moving a set of STMs closer to or further from each other) or changing the changing the shape or position of an optical element (such as a lens, spatial light attenuator, mask, STM, reflective optical element, or transmissive optical element). For example, conventional liquid lens technology may be employed to control the shape of a liquid lens (e.g., by adjusting an electrical voltage). Or, for example, one or more actuators may actuate a physical translation or rotation of an optical element (such as a lens or a STM). Each of these actuators may comprise any kind of actuator, including a linear, rotary, electrical, piezoelectric, electro-active polymer, mechanical or electro-mechanical actuator or MEMS actuator. In some cases, one or more sensors are configured to detect position or displacement and to provide feedback to one of more of the actuators.

Computers

In illustrative implementations of this invention, one or more computers (e.g., servers, network hosts, client computers, integrated circuits, microcontrollers, controllers, field-programmable-gate arrays, personal computers, digital computers, driver circuits, or analog computers) are programmed or specially adapted to perform one or more of the following tasks: (1) to control the operation of, or interface with, hardware components of a ToF imaging system, including any light source and any ToF camera; (2) to control modulation of amplitude-modulated light emitted by a light source; (3) to control timing of image acquisition by a camera; (4) to control timing of pulses of light emitted by a light source; (5) to process or post-process data acquired by a ToF camera; (6) to receive data from, control, or interface with one or more sensors; (7) to perform any other calculation, computation, program, algorithm, or computer function described or implied above; (8) to receive signals indicative of human input; (9) to output signals for controlling transducers for outputting information in human perceivable format; (10) to process data, to perform computations, to execute any algorithm or software, and (11) to control the read or write of data to and from memory devices (items 1-11 of this sentence referred to herein as the "Computer Tasks"). The one or more computers (e.g. 450, 480, 481) may be in any position or positions, including housed in or external to a ToF camera or light source. The one or more computers may communicate with each other or with other devices either: (a) wirelessly, (b) by wired connection, (c) by fiber-optic link, or (d) by a combination of wired, wireless or fiber optic links.

In exemplary implementations, one or more computers are programmed to perform any and all calculations, computations, programs, algorithms, computer functions and computer tasks described or implied above. For example, in some cases: (a) a machine-accessible medium has instructions encoded thereon that specify steps in a software program; and (b) the computer accesses the instructions encoded on the machine-accessible medium, in order to determine steps to execute in the program. In exemplary implementations, the machine-accessible medium may comprise a tangible non-transitory medium. In some cases, the machine-accessible medium comprises (a) a memory unit or (b) an auxiliary memory storage device. For example, in some cases, a control unit in a computer fetches the instructions from memory.

In illustrative implementations, one or more computers execute programs according to instructions encoded in one or more tangible, non-transitory, computer-readable media. For example, in some cases, these instructions comprise instructions for a computer to perform any calculation, computation, program, algorithm, or computer function described or implied above. For example, in some cases, instructions encoded in a tangible, non-transitory, computer-accessible medium comprise instructions for a computer to perform the Computer Tasks.

Network Communication

In illustrative implementations of this invention, electronic devices (e.g., 101, 125, 401, 425, 450, 480, 481, 725, 825, 1025, 1225) are configured for wireless or wired communication with other devices in a network.

For example, in some cases, one of more of these electronic devices (e.g., 101, 125, 401, 425, 450, 480, 481, 725, 825, 1025, 1225) may each include a wireless module for wireless communication with other devices in a network. Each wireless module (e.g., 470, 471, 472) may include (a) one or more antennas, (b) one or more wireless transceivers, transmitters or receivers, and (c) signal processing circuitry. Each wireless module may receive and transmit data in accordance with one or more wireless standards.

In some cases, one or more of the following hardware components are used for network communication: a computer bus, a computer port, network connection, network interface device, host adapter, wireless module, wireless card, signal processor, modem, router, cables or wiring.

In some cases, one or more computers (e.g., 450, 480, 481) are programmed for communication over a network. For example, in some cases, one or more computers are programmed for network communication: (a) in accordance with the Internet Protocol Suite, or (b) in accordance with any other industry standard for communication, including any USB standard, ethernet standard (e.g., IEEE 802.3), token ring standard (e.g., IEEE 802.5), wireless standard (including IEEE 802.11 (wi-fi), IEEE 802.15 (bluetooth/zigbee), IEEE 802.16, IEEE 802.20 and including any mobile phone standard, including GSM (global system for mobile communications), UMTS (universal mobile telecommunication system), CDMA (code division multiple access, including IS-95, IS-2000, and WCDMA), or LTS (long term evolution)), or other IEEE communication standard.

Definitions

The terms "a" and "an", when modifying a noun, do not imply that only one of the noun exists. For example, a statement that "an apple is hanging from a branch": (i) does not imply that only one apple is hanging from the branch; (ii) is true if one apple is hanging from the branch; and (iii) is true if multiple apples are hanging from the branch.

To compute "based on" specified data means to perform a computation that takes the specified data as an input.

Here are some non-limiting examples of a "camera": (a) a ToF camera; (b) a streak camera; (c) a digital camera; (d) a digital grayscale camera; (e) a digital color camera; (f) a video camera; (g) a light sensor or image sensor, and (h) a depth camera. A camera includes any computers or circuits that process data captured by the camera.

To say that a camera "captures" an image means that the camera measures incident light that forms the image.

Unless the context clearly indicates otherwise, "cavity" means optical cavity.

"Common logarithm" means logarithm with base 10.

The term "comprise" (and grammatical variations thereof) shall be construed as if followed by "without limitation". If A comprises B, then A includes B and may include other things.

The term "computer" includes any computational device that performs logical and arithmetic operations. For example, in some cases, a "computer" comprises an electronic computational device, such as an integrated circuit, a microprocessor, a mobile computing device, a laptop computer, a tablet computer, a personal computer, or a mainframe computer. In some cases, a "computer" comprises: (a) a central processing unit, (b) an ALU (arithmetic logic unit), (c) a memory unit, and (d) a control unit that controls actions of other components of the computer so that encoded steps of a program are executed in a sequence. In some cases, a "computer" also includes peripheral units including an auxiliary memory storage device (e.g., a disk drive or flash memory), or includes signal processing circuitry. However, a human is not a "computer", as that term is used herein.

"Defined Term" means a term or phrase that is set forth in quotation marks in this Definitions section.

Unless the context clearly indicates otherwise, "depth" means distance from a camera to a point in a scene, when the camera is oriented such that the optical axis of the camera intersects the point.

The "depth resolution" of a camera means the minimum distance, between two depths, such that the camera is configured to take measurements that distinguish between the two depths.

For an event to occur "during" a time period, it is not necessary that the event occur throughout the entire time period. For example, an event that occurs during only a portion of a given time period occurs "during" the given time period.

The term "e.g." means for example.

The fact that an "example" or multiple examples of something are given does not imply that they are the only instances of that thing. An example (or a group of examples) is merely a non-exhaustive and non-limiting illustration.

Unless the context clearly indicates otherwise: (1) a phrase that includes "a first" thing and "a second" thing does not imply an order of the two things (or that there are only two of the things); and (2) such a phrase is simply a way of identifying the two things, respectively, so that they each may be referred to later with specificity (e.g., by referring to "the first" thing and "the second" thing later). For example, unless the context clearly indicates otherwise, if an equation has a first term and a second term, then the equation may (or may not) have more than two terms, and the first term may occur before or after the second term in the equation. A phrase that includes a "third" thing, a "fourth" thing and so on shall be construed in like manner.

However, the preceding paragraph does not apply to numerical adjectives (e.g., first, second, third, fourth or fifth) that modify the terms "pass" and "roundtrip". For example, in the phrases "first roundtrip", "second roundtrip", "third roundtrip", "fourth roundtrip", "fifth roundtrip", "first roundtrip light", "second roundtrip light", "third roundtrip light", "fourth roundtrip light", and "fifth roundtrip light", the numerical adjectives are ordinal terms that indicate a temporal order.

To say that light travels in a "first pass" in an optical cavity means that light travels in a path that: (a) begins when the light enters the cavity; (b) ends when the light exits the cavity; and (c) does not include a roundtrip in the cavity.

"FP" means Fabry-Perot.

As used herein, a "Fourier plane" does not need to be an ideal Fourier optical plane. A non-limiting example of a "Fourier plane" is a geometric plane at which an actual light signal is a sufficiently close approximation (to that which would occur at a Fourier optical plane under ideal Fourier plane conditions) that a person skilled in the art would consider the geometric plane to function, for practical purposes, as a Fourier optical plane.

Light "from" a scene means light that has traveled, directly or indirectly, from the scene. Unless the context clearly indicates otherwise: (a) each description herein of light "from" the scene doing X (e.g., passing through an optical cavity and lens) is meant to describe the light doing X at a time after the light left the scene; and (b) each description herein of light "from" the scene having X done to it (e.g., being collimated) is meant to describe X being done to the light at a time after the light left the scene.

In the context of an imaging system that captures an image of a scene, to say that B is located in "front" of C means that: (1) an optical path passes through B and C; and (2) the optical distance between B and the scene is less than the optical distance between C and the scene. In the context of an imaging system that captures an image of a scene, to say that B is located "behind " C means that: (1) an optical path passes through C and B; and (2) the optical distance between B and the scene is more than the optical distance between C and the scene.

To say a "given" X is simply a way of identifying the X, such that the X may be referred to later with specificity. To say a "given" X does not create any implication regarding X. For example, to say a "given" X does not create any implication that X is a gift, assumption, or known fact.

"Herein" means in this document, including text, specification, claims, abstract, and drawings.

To "image" means to capture an image.

As used herein: (1) "implementation" means an implementation of this invention; (2) "embodiment" means an embodiment of this invention; (3) "case" means an implementation of this invention; and (4) "use scenario" means a use scenario of this invention.

The term "include" (and grammatical variations thereof) shall be construed as if followed by "without limitation".

"Intensity" means any measure of intensity, energy or power. For example, the "intensity" of light includes any of the following measures: irradiance, spectral irradiance, radiant energy, radiant flux, spectral power, radiant intensity, spectral intensity, radiance, spectral radiance, radiant exitance, radiant emittance, spectral radiant exitance, spectral radiant emittance, radiosity, radiant exposure, radiant energy density, luminance or luminous intensity.

"Lens" means a single lens, compound lens, or lens system.

"Light" means electromagnetic radiation of any frequency. For example, "light" includes, among other things, visible light and infrared light. Likewise, any term that directly or indirectly relates to light (e.g., "imaging") shall be construed broadly as applying to electromagnetic radiation of any frequency.

To say that A is "located at" at B means that the spatial position of A is at B.

"LP" means linear polarizer.

To say that a filter reflects a "majority" of light in a subband of frequencies that is incident on the filter means that, for the subband taken as a whole, the radiant flux of light that is reflected from the filter is greater than 50% of the radiant flux of light that is incident on the filter. To say that a filter transmits a "minority" of light in a subband of frequencies that is incident on the filter means that, for the subband taken as a whole, the radiant flux of light that is transmitted through the filter is less than 50% of the radiant flux of light that is incident on the filter. In the preceding two sentences, the only light that is counted is light that is in the subband.

"ND filter" means a neutral density filter.

"Nominal focal length" is defined above.

An "optical cavity" or "OC" means an optical resonator which is configured such that light reflecting inside the resonator tends, over time, to form standing waves for resonance frequencies. Hardware that satisfies the definition in the preceding sentence is an "optical cavity" even at a time when there is no light reflecting inside the hardware and even during initial roundtrips of light when resonance effects are not yet significant. An "optical cavity" may be either stable or unstable.

The "optical density" (or "O.D.") of a surface means the common logarithm of the ratio of the radiant flux incident on the surface to the radiant flux transmitted through the surface.

An "optical path" is a path that light travels. As a non-limiting example, all or part of an "optical path" may be through air, a vacuum or a lens. As a non-limiting example, if an imaging system is configured such that at least a portion of light that enters the optical system travels along a given path, then the given path is an "optical path" in that imaging system, even at a time when light is not traveling on that path.

The term "or" is inclusive, not exclusive. For example, A or B is true if A is true, or B is true, or both A or B are true. Also, for example, a calculation of A or B means a calculation of A, or a calculation of B, or a calculation of A and B.

Unless the context clearly indicates otherwise, "path" means an optical path.

"Polarizer" means an optical filter which (a) allows light that has a specific polarization (or is in a specific range of polarizations) to pass, and (b) blocks light with other polarizations.

A "ring optical cavity" or "ring cavity" means an optical cavity which is configured such that light strikes a given optical element only once during a roundtrip of light in the cavity.

To say that light travels in a "roundtrip" in an optical cavity means that light travels in a path that begins and ends at the same optical element (e.g., at the same STM) of the cavity. However, a "roundtrip" does not necessarily begin and end at the exact same spatial point. For example, in an unstable optical cavity, a roundtrip may start at a first spatial point on an STM and may end at a different spatial point on the same STM.

"Roundtrip length" means the total distance that light travels in a single, complete roundtrip inside an optical cavity.

As used herein, the term "set" does not include a group with no elements. Mentioning a first set and a second set does not, in and of itself, create any implication regarding whether or not the first and second sets overlap (that is, intersect).

A "semi-transparent mirror" or "STM" means an optical element that is partially transmissive and partially reflective, such that when light strikes the STM, a portion of the light is reflected by the STM and a portion of the light is transmitted through the STM.

Unless the context clearly indicates otherwise, "some" means one or more.

A "spatial light attenuator", also called an "SLA", means a device that (i) either transmits light through the device or reflects light from the device, and (ii) attenuates the light, such that the amount of attenuation of the light depends the spatial position at which the light is incident on the device. Non-limiting examples of an SLA include a mask, an LCD (liquid-crystal display) and a DMD (digital micromirror device).

"Substantially" means at least ten percent. For example: (a) 112 is substantially larger than 100; and (b) 108 is not substantially larger than 100.

The term "such as" means for example.

To say that A happens and "then" B happens, means that A happens before B happens.

A statement that light passes through A "and" B: (a) is true if light passes through A and then passes through B; and (b) is true if light passes through B and then passes through A. For example, a statement that light passes through a cavity "and" a lens: (a) is true if light passes through the cavity and then passes through the lens; and (b) is true if light passes through the lens and then passes through the cavity.

To say that light which passes through an optical cavity is filtered by a filter does not imply a temporal order in which the passing and filtering occur. For example, a statement that "light that passes through an optical cavity is filtered by a spectral filter": (a) is true if the light is filtered by the filter and then passes through the cavity; and (b) is true if the light passes through the cavity and then is filtered by the filter.

The "temporal resolution" of a camera means the minimum time difference, between a first time-of-arrival of light and a second time-of-arrival of light, such that the camera is configured to take measurements that distinguish between the two times-of-arrival.

"Time-of-arrival" means the time at which light arrives at a camera.

In the context of light that travels from a camera to a scene and then back to the camera, "time-of-flight" means the amount of time that it takes for the light to travel from the camera to the scene and then back to the camera.

"Time-of-flight camera" or "ToF camera" means a camera that has a temporal resolution which is less than 3 nanoseconds or that has a depth resolution which is less than 1 meter.

To say that a machine-readable medium is "transitory" means that the medium is a transitory signal, such as an electromagnetic wave.

"Unstable" is defined above.

A matrix may be indicated by a bold capital letter (e.g., D). A vector may be indicated by a bold lower-case letter (e.g., a). However, the absence of these indicators does not indicate that something is not a matrix or not a vector.

An "x-t streak image" means an image that: (a) is captured by a streak camera; (b) measures spatial information in only one spatial dimension x; and (c) has two axes, x and t, where the t axis represents time and the x axis represents the spatial dimension x.

Except to the extent that the context clearly requires otherwise, if steps in a method are described herein, then the method includes variations in which: (1) steps in the method occur in any order or sequence, including any order or sequence different than that described; (2) any step or steps in the method occurs more than once; (3) any two steps occur the same number of times or a different number of times during the method; (4) any combination of steps in the method is done in parallel or serially; (5) any step in the method is performed iteratively; (6) a given step in the method is applied to the same thing each time that the given step occurs or is applied to different things each time that the given step occurs; (7) one or more steps occur simultaneously, or (8) the method includes other steps, in addition to the steps described herein.

Headings are included herein merely to facilitate a reader's navigation of this document. A heading for a section does not affect the meaning or scope of that section.

This Definitions section shall, in all cases, control over and override any other definition of the Defined Terms. The Applicant or Applicants are acting as his, her, its or their own lexicographer with respect to the Defined Terms. For example, the definitions of Defined Terms set forth in this Definitions section override common usage or any external dictionary. If a given term is explicitly or implicitly defined in this document, then that definition shall be controlling, and shall override any definition of the given term arising from any source (e.g., a dictionary or common usage) that is external to this document. If this document provides clarification regarding the meaning of a particular term, then that clarification shall, to the extent applicable, override any definition of the given term arising from any source (e.g., a dictionary or common usage) that is external to this document. To the extent that any term or phrase is defined or clarified herein, such definition or clarification applies to any grammatical variation of such term or phrase, taking into account the difference in grammatical form. For example, the grammatical variations include noun, verb, participle, adjective, and possessive forms, and different declensions, and different tenses.

Variations

This invention may be implemented in many different ways. Here are some non-limiting examples:

In some implementations, this invention is a system comprising a lens, an optical cavity and a time-of-flight (ToF) camera, wherein the system is configured to capture an image of a scene, such that the image is formed by light that is from the scene and that passes through the optical cavity and the lens. In some cases, the lens is located in front of the optical cavity. In some cases: (a) a rear focal plane of the lens is located at a distance from the lens; and (b) the distance is less than the nominal focal length of the lens, due to folding of optical paths in the optical cavity. In some cases, all or part of the lens is located inside the optical cavity. In some cases: (a) the system is configured to capture a first focused image at a first depth in a scene and a second focused image at a second depth in the scene, such that, at all times during the capture of the first and second images, all optical elements of the system remain in a fixed shape and remain stationary relative to each other and to the scene; and (b) the first depth is less than half of the second depth. In some cases, the lens is located behind the optical cavity and in front of the ToF camera. In some cases: (a) the system includes a first filter that is a neutral-density filter which is configured to allow a band of frequencies of light to pass through the first filter; (b) the band of frequencies includes a first subband of frequencies and a second subband of frequencies, the first band being different than the second band; (c) the system also includes a second filter and a third filter; (d) the second filter comprises a spectral filter that is configured (i) to reflect a majority of, and to transmit a minority of, light in the first subband of frequencies and (ii) to transmit a majority of light in the second subband of frequencies; (e) the third filter comprises a spectral filter that is configured (i) to reflect a majority of, and to transmit a minority of, light in the second subband of frequencies and (ii) to transmit a majority of light in the first subband of frequencies; (f) the first filter is in front of the second filter and the second filter is in front of the third filter; (g) the first and second filters comprise the optical cavity mentioned in the first sentence of this paragraph (first optical cavity); and (h) the first and third filters comprise a second optical cavity. In some cases: (a) the ToF camera has a temporal resolution; and (b) the system is configured to have an impulse response such that, in response to an input that consists of a pulse of light from the scene entering the first filter (i) a first set of exit pulses exits the first optical cavity and a second set of exit pulses exits the second optical cavity, (ii) the first set of exit pulses includes a first pulse which is the earliest pulse that exits the first optical cavity after the input, (iii) the second set of exit pulses includes a second pulse which is the earliest pulse that exits the second optical cavity after the input, and (iv) the first pulse arrives at the ToF camera at a first time and the second pulse arrives at the ToF camera at a second time, such that the absolute value of the first time minus the second time is greater than the temporal resolution of the ToF camera. In some cases: (a) the system further comprises a waveplate and a polarizer; (b) all or part of the waveplate is located inside the optical cavity; and (c) the polarizer is behind the optical cavity and in front of the ToF camera. In some cases, the system is configured such that light passes through the waveplate during each roundtrip of light in the optical cavity. In some cases: (a) the optical cavity is unstable; (b) the system further comprises a collimating lens and a spatial light attenuator; (c) the collimating lens is configured to output collimated light that, while collimated (i) passes through a Fourier optical plane and (ii) then is incident on the optical cavity; (d) all or part of the spatial light attenuator is located inside the optical cavity; (e) the collimating lens is in front of the optical cavity; and (f) the lens mentioned in the first sentence of this paragraph is behind the optical cavity. In some cases, the system is configured such that the image is formed by light that exited the optical cavity before completing more than one hundred roundtrips in the optical cavity. In some cases, the system is configured such that: (a) the optical cavity has a dominant mode; (b) a wavefront of light evolves over time inside the optical cavity; and (c) the image is formed by light that exits the optical cavity at a time when the integral power of the dominant mode of the optical cavity is less than the half-maximum of the integral power of the wavefront inside the optical cavity. In some cases, the light is pulsed. In some cases, the light is not pulsed. In some cases: (a) the system further comprises a second optical cavity, a first spectral filter, and a second spectral filter; (b) the first spectral filter is configured to allow only a first frequency band of light to pass through the first spectral filter and the second spectral filter is configured to allow only a second frequency band of light to pass through the second spectral filter, the first band being different than the second band; (c) the second spectral filter is positioned, relative to the second optical cavity, such that light that passes through the second optical cavity is filtered by the second spectral filter; (d) the first spectral filter is positioned, relative to the optical cavity mentioned in the first sentence of this paragraph (first optical cavity), such that light that passes through the first optical cavity is filtered by the first spectral filter; and (e) a roundtrip length of the first optical cavity is substantially different than a roundtrip length of the second optical cavity. In some cases: (a) the time-of-flight camera has a temporal resolution; and (b) the system is configured to have an impulse response such that, in response to an input that consists of a pulse of light entering the first and second spectral filters simultaneously (i) a first set of exit pulses exits the first optical cavity and a second set of exit pulses exits the second optical cavity, (ii) the first set of exit pulses includes a first pulse which is the earliest pulse that exits the first optical cavity after the input, (iii) the second set of exit pulses includes a second pulse which is the earliest pulse that exits the second optical cavity after the input, and (iv) the first pulse exits the first optical cavity at a first time and the second pulse exits the second optical cavity at a second time, such that the absolute value of the first time minus the second time is greater than the temporal resolution of the time-of-flight camera. Each of the cases described above in this paragraph is an example of the system described in the first sentence of this paragraph, and is also an example of an embodiment of this invention that may be combined with other embodiments of this invention.

In some implementations, this invention is a method comprising capturing an image of a scene, such that the image is captured by a time-of-flight (ToF) camera and is formed by light that (i) is from the scene and (ii) passes through an optical cavity and a lens before reaching the ToF camera. In some cases, the light passes through the lens before passing through the optical cavity. In some cases, all or part of the lens is located inside the optical cavity. In some cases, wherein the light passes through the optical cavity before passing through the lens. In some cases, the method further comprises: (a) passing the light through a waveplate, while the light is inside the optical cavity; and (b) passing the light through a linear polarizer, after the light exits the optical cavity. In some cases: (a) the optical cavity is unstable; and (b) the method further comprises passing the light from the scene through an additional lens that outputs collimated light which, after exiting the additional lens and while still collimated (i) passes through a Fourier optical plane and (ii) then is incident on the optical cavity. Each of the cases described above in this paragraph is an example of the method described in the first sentence of this paragraph, and is also an example of an embodiment of this invention that may be combined with other embodiments of this invention.

Each description above of any method or apparatus of this invention describes a non-limiting example of this invention. This invention is not limited to those examples, and may be implemented in other ways.

Each description above of any implementation, embodiment or case of this invention (or any use scenario for this invention) describes a non-limiting example of this invention. This invention is not limited to those examples, and may be implemented in other ways.

Each Figure that illustrates any feature of this invention shows a non-limiting example of this invention. This invention is not limited to those examples, and may be implemented in other ways.

The Provisional Application does not limit the scope of this invention. The Provisional Application describes non-limiting examples of this invention, which examples are in addition to—and not in limitation of—the implementations of this invention that are described in the main part of this document. For example, if any feature described in the Provisional Application is different from, or in addition to, the features described in the main part of this document, this additional or different feature of the Provisional Application does not limit any implementation of this invention described in the main part of this document, but instead merely describes another example of this invention. As used herein, the "main part of this document" means this entire document (including any drawings listed in the Brief Description of Drawings above), except that the "main part of this document" does not include any document that is incorporated by reference herein.

The above description (including without limitation any attached drawings and figures) describes illustrative implementations of the invention. However, the invention may be implemented in other ways. The methods and apparatus which are described herein are merely illustrative applications of the principles of the invention. Other arrangements, methods, modifications, and substitutions by one of ordinary skill in the art are therefore also within the scope of the present invention. Numerous modifications may be made by those skilled in the art without departing from the scope of the invention. Also, this invention includes without limitation each combination and permutation of one or more of the implementations (including hardware, hardware components, methods, processes, steps, software, algorithms, features, or technology) that are described or incorporated by reference herein.

What is claimed is:

1. A system comprising a lens, an optical cavity and a time-of-flight camera, wherein:
   (a) the system is configured to capture an image of a scene, in such a way that the image is formed by light that is from the scene and that passes through the optical cavity and the lens;
   (b) the lens is located in front of the optical cavity;
   (c) a rear focal plane of the lens is located at a distance from the lens; and
   (d) the distance is less than the nominal focal length of the lens, due to folding of optical paths in the optical cavity.

2. A system comprising a lens, an optical cavity and a time-of-flight camera, wherein:
   (a) the system is configured to capture an image of a scene, in such a way that the image is formed by light that is from the scene and that passes through the optical cavity and the lens;
   (b) all or part of the lens is located inside the optical cavity;
   (c) the system is configured to capture a first focused image at a first depth in a scene and a second focused image at a second depth in the scene, in such a way that, at all times during the capture of the first and second images, all optical elements of the system remain in a fixed shape and remain stationary relative to each other and to the scene; and
   (d) the first depth is less than half of the second depth.

3. A system comprising a lens, an optical cavity and a time-of-flight camera, wherein:
   (a) the system is configured to capture an image of a scene, in such a way that the image is formed by light that is from the scene and that passes through the optical cavity and the lens; and
   (b) the system is configured in such a way that the image is formed by light that exited the optical cavity before completing more than one hundred roundtrips in the optical cavity.

* * * * *